United States Patent [19]

Prevost et al.

[11] Patent Number: 5,123,084
[45] Date of Patent: Jun. 16, 1992

[54] METHOD FOR THE 3D DISPLAY OF OCTREE-ENCODED OBJECTS AND DEVICE FOR THE APPLICATION OF THIS METHOD

[75] Inventors: Guy Prevost, Gif sur Yvette; Daniel Milon, Issy les Moulineaux; Olivier Lis, Versailles; Michel Delcroix, Les Plessis Bouchard, all of France; Bruce Edwards, Reston, Va.; Donald Meagher, San Jose, Calif.

[73] Assignees: General Electric CGR S.A., Paris, France; Octree Corporation, San Jose, Calif.

[21] Appl. No.: 630,782

[22] Filed: Dec. 21, 1990

Related U.S. Application Data

[63] Continuation of Ser. No. 289,380, Dec. 23, 1988, abandoned.

[30] Foreign Application Priority Data

Dec. 24, 1987 [FR] France .................. 87-18151

[51] Int. Cl.$^5$ .............................................. G06F 15/62
[52] U.S. Cl. .................................... 395/120; 395/127; 395/121
[58] Field of Search ................ 364/518, 521, 522; 340/729, 747

[56] References Cited

U.S. PATENT DOCUMENTS

| | | | |
|---|---|---|---|
| 3,602,702 | 8/1971 | Warnock | 364/522 |
| 4,631,690 | 12/1986 | Corthout et al. | 364/518 |
| 4,694,404 | 9/1987 | Meagher | 364/518 |
| 4,719,585 | 1/1988 | Cline et al. | 364/518 |
| 4,729,098 | 3/1988 | Cline et al. | 364/521 X |
| 4,737,921 | 4/1988 | Goldwasser et al. | 364/518 |
| 4,791,583 | 12/1988 | Colburn | 364/522 |
| 4,797,842 | 1/1989 | Nackman et al. | 364/522 X |

FOREIGN PATENT DOCUMENTS

| | | |
|---|---|---|
| 152741 | 8/1985 | European Pat. Off. |
| 8102210 | 8/1981 | World Int. Prop. O. |

OTHER PUBLICATIONS

Mesure. Regulation Automatisme, vol. 50, No. 11, Sep. 23, 1985, pp. 113-117; J. Birbaum, et al.
Wescon Proceedings, vol. 29, Nov. 19-22, 1985, pp. 5/3 1-9; C. Carinalli.
Computer Graphics and Image Processing, vol. 19, No. 2. Jun. 1982, pp. 129-147; D. Meagher.
Computers and Graphics, vol. 9, No. 2, 1985, pp. 107-116, F. Herbert.
Proceedings of the IEEE, vol. 71, No. 3, Mar. 1983, pp. 420-431; J. K. Udupa.

*Primary Examiner*—Gary V. Harkcom
*Assistant Examiner*—Michael A. Jaffe
*Attorney, Agent, or Firm*—Oblon, Spivak, McClelland, Maier & Neustadt

[57] ABSTRACT

The 3D display device of the invention is based on an octree structure of data pertaining to an object to be displayed. This structure is memorized in a memory associated with a cache memory sending blocks of data on a bus to which a geometrical processor and an image-generating circuit are connected. The geometrical processor generates the visible part of another octree corresponding to a target universe which may be positioned in any way in relation to the object universe (a cube enclosing all the data to be represented).

2 Claims, 18 Drawing Sheets

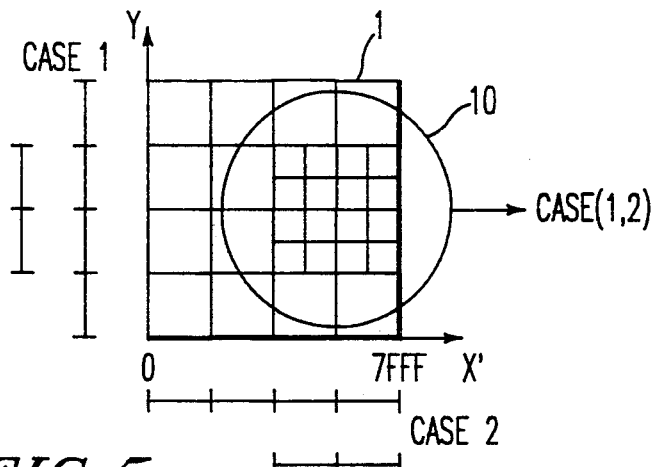
*FIG. 5*
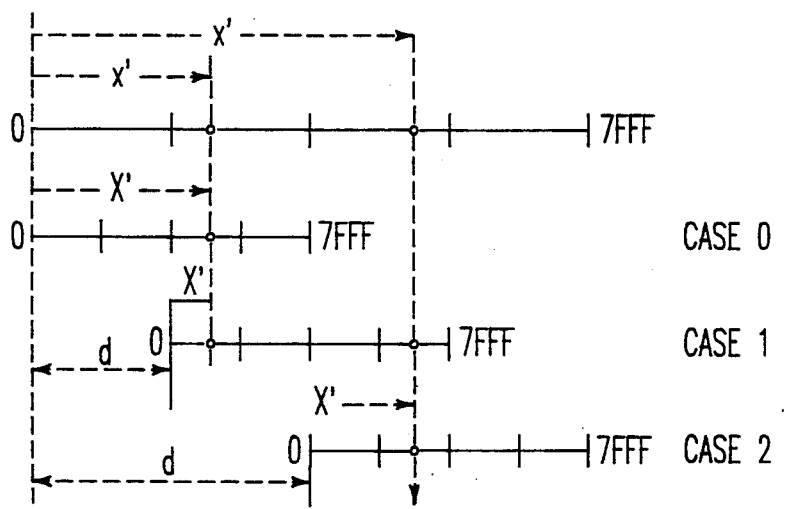
*FIG. 6*
*FIG. 7*
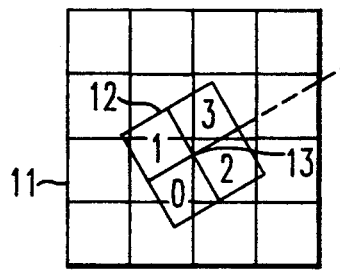
*FIG. 8*
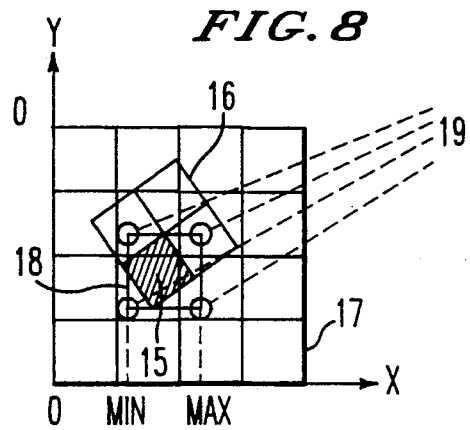

METHOD FOR THE 3D DISPLAY OF OCTREE-ENCODED OBJECTS AND DEVICE FOR THE APPLICATION OF THIS METHOD

This application is a continuation of application Ser. No. 07/289,380, filed on Dec. 23, 1988, now abandoned.

BACKGROUND OF THE INVENTION

1. Field of the Invention

An object of the present invention is a method for the three-dimensional display of octree-encoded objects and a device for the application of this method.

2. Description of the Prior Art

The octree encoding of images is well-known from many publications, for example, the article by D. J. R. MEAGHER: "High Speed Display of 3D Medical Images using Octree Encoding" in "Rensselaer Polytechnic Institute Technical Report", September 1981, or another article by the same author "Geometric Modeling Using Octree Encoding" in the journal "Computer Graphics and Image Processing" No. 19, June 1982, pages 129 to 147.

Moreover, the U.S. Pat. No. 4,694,404 and the European patent application No. 0 152 741 also describe a method for 3D display based on images of an octree-encoded object. This method consists essentially in forming the projection of an object, using octree data organized in an object universe, in a target plane which is parallel to the observation screen.

This prior art method gives good quality 3D images but calls for complicated and expensive equipment.

SUMMARY OF THE INVENTION

An object of the present invention is a method for the 3D display of octree-encoded objects, which is very fast both for external views, if necessary with shading, and for views along any slice, requiring uncomplicated and inexpensive equipment.

The method of the invention consists in using an object universe, for which the octree can be obtained, to generate the visible part of another octree, corresponding to a target universe which may be positioned in any manner with respect to an object universe, the octree being a tree structure, obtained at each level by a division by two, along each axis of coordinates, of the dimensions of the object universe or of its sub-universes, the object universe being a cube that encloses all the data to be represented, and the target universe being a hexahedron used to define another octree.

The useful part of this said other octree can be used either to represent the visible part of an object (with the elimination of the hidden parts) or to eliminate everything that is on the "wrong" side of a cut plane, or to select only those obels that are in the cut plane, or again, to select everything (in the transparent mode).

The device used to apply the method of the invention comprises an octree cache memory connecting the octree memory to a data bus to which a geometrical processor and an image-generating device are connected, the said image-generating device being connected to an image memory.

BRIEF DESCRIPTION OF THE DRAWINGS

The present invention will be better understood from the following description of an embodiment, taken as a non-exhaustive example and illustrated by the appended drawings, of which:

FIGS. 5 and 6 are diagrams that explain the obtaining and numbering of child overlays;

FIG. 7 is a diagram that explains the obtaining of the target universe according to the invention;

FIGS. 8 and 9 are, respectively, a diagram explaining the test used to determine the values of the image elements as seen from the target and a diagram explaining the choice of the new overlay according to the invention;

DESCRIPTION OF PREFERRED EMBODIMENTS

Before explaining the present invention in detail, we shall briefly recall (with reference to FIGS. 1 to 6) the manner in which data corresponding to 3D objects are arranged in memory, for example data coming from successive parallel slices made by a scanner, and the manner in which these data are used.

Figure 1:
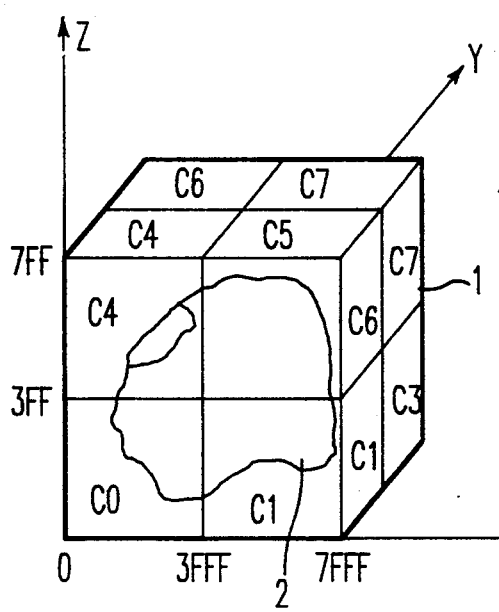
FIG. 1 is a schematic perspective view of an object universe.
Figure 2A:
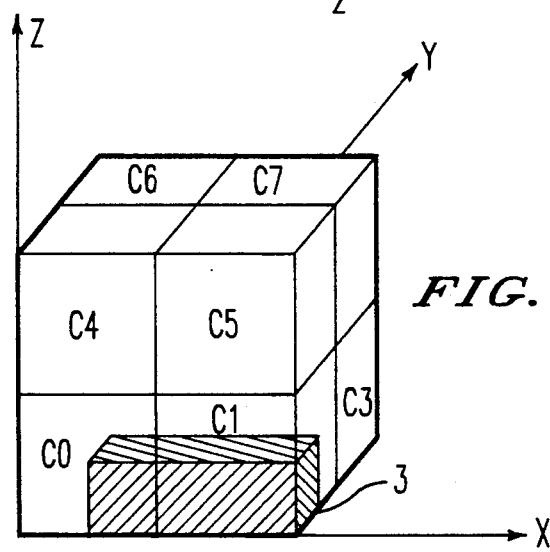
FIG. 2A-2D are simplified diagrams explaining the formation of the octree structure.
Figure 2B:
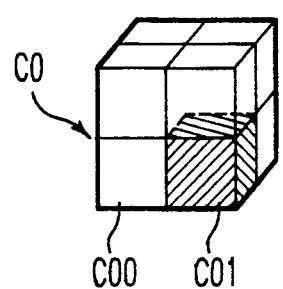
Figure 2C:
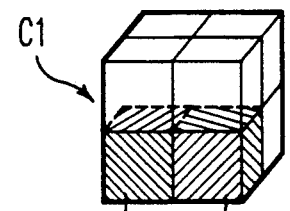
Figure 2D:
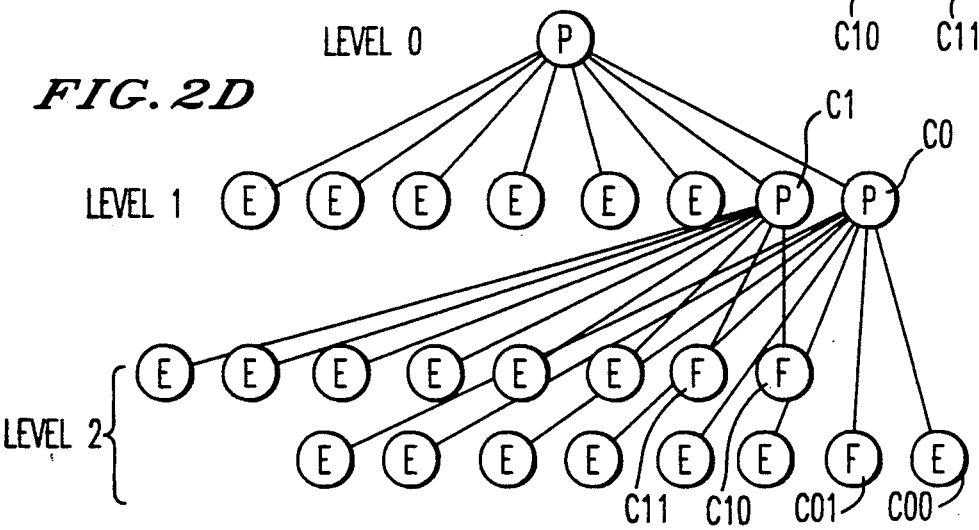

FIG. 1 shows a cube 1 which is called an object universe and which encloses all the data to be represented, i.e. the object 2 (in 3D) to be represented is entirely entered within it. This cube 1 is pointed in such a way that each of its edges is parallel with one of the three axes of a system of rectangular coordinates Ox, Oy, Oz, one of the corners of the cube being placed at the point of origin O of the system of coordinates. For reasons explained further below, the dimensions of the cube 1 are equal to 7FFF in hexadecimal notation, but are not equal to the real dimensions of the object to be represented.

To make it possible to sample the object contained in the cube 1, a hierarchical dichotomy is made. For this, the cube 1 is divided into eight equal cubes marked C0 to C7. This is done by dividing the cube 1 into two, parallel to each of the three planes forming the trihedron (Ox, Oy, Oz). Each of the cubes C0 to C7 has edges of a length equal to 3FFF in hexadecimal notation.

Each of the cubes C0 to C7 will be similarly divided into eight, and so on. Thus, we obtain a hierarchy with several levels, at the tip of which (the level zero by definition) is located the cube 1. At the level 1, we have the cubes C0 to C7 and so on. Further below we shall explain the level at which this hierarchy is stopped to achieve the desired resolution.

The cube 1 is called the "parent" of the cubes C0 to C7 which are called "obels" (a contraction of object element). Each of the cubes C0 to C7 is the parent of eight cubes of the following level (level 2) and so one.

At each level, the numbering of the eight cubes or child obels, derived from one and the same parent, follows a fixed rule.

Thus, at the level 1 as shown in FIGS. 2A–2D, the respective coordinates, in hexadecimal notation, of the centers of the child obels, are the following (on Ox, Oy, Oz):

|      |                      |
| ---- | -------------------- |
| C0:  | 1FFF, 1FFF, 1FFF     |
| C1:  | 5FFF, 1FFF, 1FFF     |
| C2:  | 1FFF, 5FFF, 1FFF     |
| C3:  | 5FFF, 5FFF, 1FFF     |
| C4:  | 1FFF, 1FFF, 5FFF     |
| C5:  | 5FFF, 1FFF, 5FFF     |
| C6:  | 1FFF, 5FFF, 5FFF     |
| C7:  | 5FFF, 5FFF, 5FFF     |

We shall now examine how the coordinates of the points contained in the cubes are written in firstly in hexadecimal notation and secondly in binary notation. To simplify the explanation, we shall take the coordinates along Ox of the centers of the cubes C0 and C1. From there onwards, it will be easy to generalize the notations for other axes of coordinates and at any level whatsoever.

For the center of C0, the coordinate $x_o$ is:

| $x_o$ | = | 1   | F    | F    | F    | (hexadecimal) |
| ----- | - | --- | ---- | ---- | ---- | ------------- |
| or    |   |     |      |      |      |               |
| $x_o$ | = | 001 | 1111 | 1111 | 1111 | (binary)      |

For the center of C1, the coordinate x1 is:

| x1 | = | 5   | F    | F    | F    | (hexadecimal) |
| -- | - | --- | ---- | ---- | ---- | ------------- |
| or |   |     |      |      |      |               |
| x1 | = | 101 | 1111 | 1111 | 1111 | (binary)      |

In binary notation, the bits used have (from left to right) the respective weights 0 to 14. It can be seen that it suffices to examine the bits with a weight of 14 to determine whether the points in question are located in the cube on the left (C0), bit=0, or in the cube on the right (C1), bit 1. The same is true of any point contained in these cubes: the coordinate along Ox of any point contained in C0 is smaller than 3FFF, i.e. its bit with a weight 14, in binary notation, is always null while the coordinate along Ox of any point in C1 ranges between 3FFF and 7FFF, i.e. in binary notation its bit with a weight 14 is always equal to 1.

The splitting up of the object universe (the initial universe) thus made forms a tree structure which shall be called an octree (a contraction of octant tree). Each node of this tree structure corresponds to a cube. An octree node supports two types of data: a value of the status of the node and various properties.

The status of a node may have three values: E, P or F:

E (for "empty") represents an empty node meaning that the volume of the corresponding cube contains no properties attached. The corresponding cube will not be split up any further and will therefore have no children. This is the case when a cube is entirely outside the object to be represented (it encloses nothing but the surrounding air);

P (for "partial") represents a node, some of whose descendants possess properties. This is the case for a cube having one part located in the object to be represented and one part outside this object.

F (for "full") represents a node that has a uniform property but no descendants and is therefore a "leaf" of the octree.

The properties of a node represent the characteristic data of the corresponding obel. For a leaf obel this data may, for example, pertain to a density of matter measured by scanner. For a partially filled obel (node P), this data may be a condensation of the data of the child obels (the average of the densities of the children or else the minimum and maximum densities of the children).

When the sole property is the presence or absence of the object in the obel considered, the encoding of the value of the obel by F, P or E suffices, and no property encoding is necessary. The object described is then said to be binary.

FIGS. 2A–2D show a simplified example of an octree. It has been assumed that the object 3 to be represented is contained in the cubes C0 and C1 only, that this object is a rectangular parallelepiped with its edges parallel to the axes Ox, Oy and Oz respectively. The object 3 extends along Ox from 1FFF to 7FFF, along Oy from 0 to 1FFF and along Oz from 0 to 1FFF. It is assumed that this object is binary.

At the level 0, the node corresponding to the cube 1 is "P". At the level 1, among the eight children of the cube 1, only the first two are "P", the others are "E" (the numbering is done from right to left, C0 to C7, for each level). Hence, only the cubes C0 and C1 will have children at the level 2. The children of the cubes C0 to C1 will be C00 to C07 and C10 to C17 respectively. Of C0's children, C01 is "F", and all the others are "E", and of C1's children, C10 and C11 are "F" and all the others are "E", as can be seen in the diagrams of C0 and C1, drawn separately in FIGS. 2A–2D. There is no longer any need to go down in the hierarchy after level 2, since it no longer has any "P" nodes.

After this explanation of how an octree is obtained, we shall now explain how the data are encoded and how they are arranged in memory (octree memory) so that they can be used as easily as possible.

Since the status of a node can have three values, these values are encoded on two bits. For example, 00 will be encoded for E, 01 for P, 10 for F. The remaining value 11=F1 can be used to represent a second object in the same structure of data.

A set of eight nodes sharing the same parent is defined as a packet of modes. A packet is therefore encoded on 16 bits formed by the concatenation of values of the eight nodes, in the order of their obel numbers, the number 0 (zero) being on the side of the least significant bits.

A block of node packets is defined as a set of node packets which are the children of the nodes of one and the same node packet called the parent packet of the block. A block may therefore contain 1 to 8 node packets (namely 8 to 64 nodes) depending on the number of partial nodes ("P") of the packet of parent nodes.

A block of node packets is stored in a memory at successive addresses of 32-bit words. The address of the first node packet of a block is called a block address. Each 32-bit word contains, in 16 bits, for example, the 16 least significant bits, the 8 values of the nodes of the corresponding node packet and, in the 16 other bits (the most significant bits in the above-mentioned example), the address offset.

Figure 3:
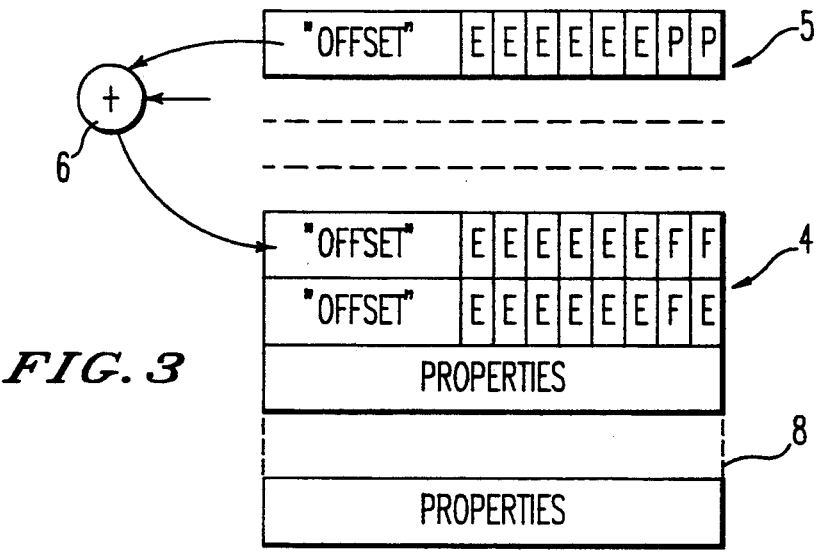
FIG. 3 is a diagram that partially shows the organization of data in the octree memory in the case of a short offset, while FIG. 3A pertains to a long offset.

This address offset is the value that must be given to the absolute memorized address of a parent node packet to find the absolute memorized address of each of the packets of its block of child packets. FIG. 3 gives a schematic view of a child block 4 and its parent 5. Reference 6 symbolizes an adder adding the offset, the said offset being marked 7.

Figure 3A:
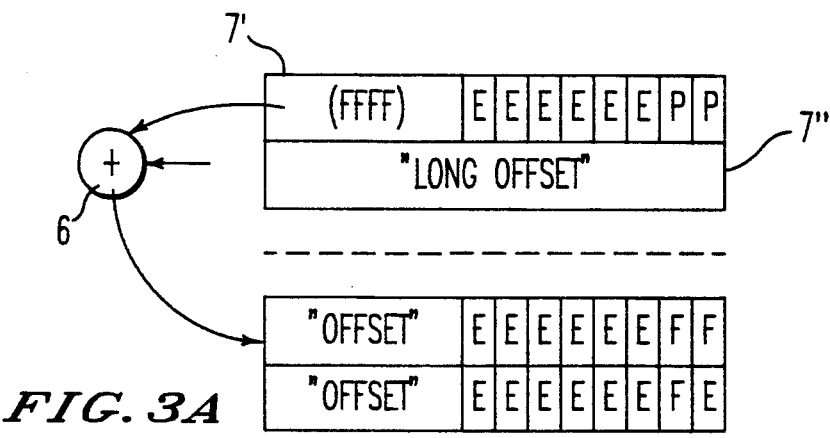

When the offset is greater than or equal to $FFFF_h$ (namely 16 bits all equal to "1"), or when it is negative, the indicator $FFFF_h$ is written in the field 7' of 16 most significant bits, and the offset 7'' proper is stored in the following address, in a signed format as indicated in FIG. 3a.

The various properties of the nodes of one and the same block 4 are, if necessary, memorized in a field immediately after this block (reference 8 in FIG. 3) in the order of the nodes in the block, for nodes which have a property. The length of the field 8 depends on the length of the encoding of the properties.

The various data concerning the properties of the nodes may be, for example, the density (scanner density) encoded on 8 or 12 bits, 2n (n=4 for example) identification bits used to identify n different objects in the same node (when the above-mentioned value for encoding the status of the node F1=11 does not suffice, namely if there are more than two objects) and a conventionally pre-calculated shading on eight or twelve bits for example.

The octree is sited in a memory called an octree memory, addressed by 32-bit words in the preferred embodiment. The address of the octree is the address of the node packet of the level 0 of the octree. This packet of nodes, called a parent node packet, is a block reduced to a single packet of nodes. The properties, if any, of each of the eight nodes of this packet, are stored following this packet. (In fact, in the theoretical octree structure of FIGS. 2A-2D, the node "P" of the tip of the hierarchy may be omitted in a memorized octree, since in the vast majority of real cases, this node is always "P". It suffices then to shift the levels of the entire theoretical hierarchy by one level downwards, the level 0 then being the first of the first eight child nodes of a single parent which is eliminated).

To make it possible to use the memorized structure, in order to display the object enclosed in the object universe on a screen placed in any direction with respect to this object, it is necessary, firstly, to determine, for any point of the object, not only its own obel, but also the seven obels adjacent to the said obel, which are the closest to this point and which are in the same level of the octree. This set of eight obels, forming a cube, shall be called an "overlay". These eight obels which are each connected by three sides to three of the other obels, do not necessarily share the same parent in the octree. It is therefore necessary to have eight node packets (namely 64 nodes) to characterize the properties of an overlay. As we shall see further below, the overlays are used to establish another octree corresponding to any angle of view of the object since, in this case, the obel determined for a point of this object in a system of coordinate axes relative to this angle of view (plane of the axes Ox and perpendicular to the axis of observation) overlaps the obels neighbouring the original obel of the point, and these are neighbouring obels which should be taken into account if no data are to be lost.

An overlay is identified by three axes Ox', Oy', Oz' parallel to the axes of the object universe 1, the point of origin O of the overlay being one of the corners of the obel number zero of the overlay. The fictitious dimensions of the overlay are, at each level, in hexadecimal notation (7FFF, 7FFF, 7FFF). The obels of the overlay are numbered according to the same rule as for the octree.

At every level of the octree, an overlay demarcates a space of the object universe containing all the data needed for the processing of this level. At every level, the overlay is identified by coordinates (x', y', z') ranging between 0 and 7FFF (in hexadecimal notation).

Figure 4:
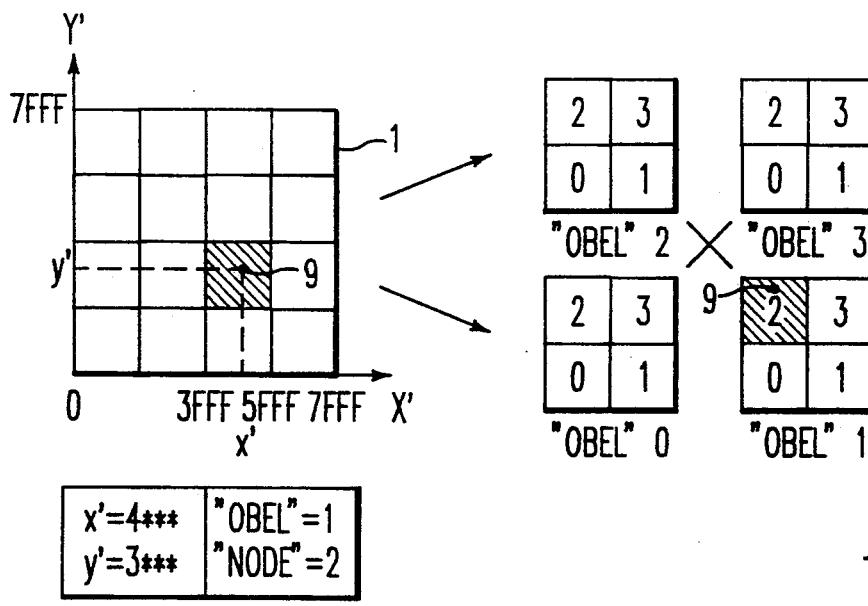
FIG. 4 is a two-dimensional diagram explaining the sampling of an overlay.

The diagram of FIG. 4 (which is given in two dimensions, to be generalized for three dimensions) shows the way in which the overlays are determined. Take a point 9 of the object to be displayed. This point is located in the hachured obel, namely the obel marked C12 (the second child obel of the obel C1 or the second node of the packet of children of the obel 1). Given that the abscissa x' of the point 9 ranges between 3FFF (the abscissa of the center of the cube 1) and 5FFF (the abscissa of the center of the obel C1), its value has the following form in hexadecimal notation: x'=4ghk (ghk being hexadecimal digits ranging between 0 and F). Similarly, the ordinate y' of the point 9 has the form y'=3uvw. Thus for a point given in an overlay by its coordinates x', y', z', the data attached to this point must be found in the memorized octree. For this, the addresses (obel, node) in the overlay, which will make it possible to recover the address in the memorized octree, must be made to correspond with each set of coordinates (x', y', z').

Since the overlay is divided into 64 nodes, the two bits with a weight of 14 and 13 of the coordinates (x', y', z') of any point in the overlay respectively give the obel number and the node number in this obel which contains the point in question: (relationship No. 1).

Obel number def (which is a binary number with d=bit 14 of z', e=bit 14 of y' and f=bit 14 of x').

And,

Node number=ghi (which is also a binary number in which b=bit 13 of z', h=bit 13 of y' and i=bit 13 of x').

Among the 64 nodes of an overlay, there are 27 ways (three ways along each axis of coordinates: two adjacent nodes out of four) to choose eight nodes to form the eight obels of a new overlay known as a child overlay. An overlay therefore has 27 children.

FIGS. 5 and 6 give a schematic illustration of the way in which the overlays must be chosen (FIG. 5 has been shown in the plane Ox', Oy', and will be easily generalized for three dimensions).

For each axis of coordinates, there are three possible cases which will be numbered 0 to 2:

Case 0: the child overlay is in the interval 0–3FFF,

Case 1: the child overlay is in the interval 2000–5FFF,

Case 2: the child overlay is in the interval 4000–7FFF,

The child overlays shown in the circle 10 of FIG. 5 refers to the case for the axis Oy' and to the case 2 for the axis Ox'.

The 27 possible cases are marked by the triplet of cases relating to each of the dimensions: (along Oz'; along Oy'; along Ox').

The child overlay is again dimensioned 0 to 7FFF (of course, the value 7FFF of the child overlay is not the same as the value of the parent but is equal to half of it).

If X' is the coordinate along Ox' of a point in the child overlay and x' its coordinate in the parent, we get the relationship: (relationship No. 2).

$$X' = 2 \cdot (x' - d)$$

the value of d (in hexadecimal notation) being (see FIG. 6):

0 in the case 0,
2000 in the case 1,
4000 in the case 2.

Since the aim of the invention is to represent the image of an object on a screen, we shall now define a target universe. The following description pertains to a case where a straight forward projection is made, but it is understood that the invention is not limited to a projection of this type, and that it is possible to make, for example, a perspective projection by deforming the target universe correspondingly. Unlike the method described in the above-mentioned European patent, according to which the various obels are projected in the plane of the screen, the method of the present invention consists essentially, in defining, from the memorized octree, another octree, the axes $Ox''$ and $Oy''$ of which form a plane which is parallel to the display screen, the axis $Oz''$ of the new octree being pointed towards the screen, and only the part visible from the screen of this new octree will be generated.

The target universe (by analogy with the object universe) is the one corresponding to the new octree. This universe is entirely included in the overlay of the object. The position of the target universe is defined in the system of coordinates of the overlay of the object by its center which we shall call herein target center and by the translation to be made in the overlay from this center towards a specific point of the target. This translation shall herein be called child offset or Bbox offset for certain specific points of the target which shall be described further below. FIG. 7 gives a highly schematic view (which is not at all a conventional projection of volumes on a plane, but rather an explanatory diagram) of any overlay 11 as well as a target universe 12, the center of which is marked 13.

The target universe 12 is such that, as specified above, the plane formed by its axes $Ox''$, $Oy''$ is parallel to the plane of a screen 14.

The target universe represents the obel of the level zero of the octree to be generated. Each obel has eight children defined by dichotomy, i.e. by dividing the obel into two along each coordinate axis. The successive division of all the obels defines the tree structure of the target octree.

The image universe is defined as the canonical projection of the target universe on the screen 14. The position of the target universe in the overlay 11 of the object is therefore determined by the angle at which it is desired to view the object.

The target octree is projected canonically in a quadtree image ("quad" because there are four possibilities for it is a projection on one plane). The correspondence between the obel numbers of the target octree and the imel (contraction of image elements since a plane is involved) numbers of the image quadtree is constant and independent of the angle of view as well as the level of the octree.

The obels of the octree are projected on the imels of the quadtree of the image as follows, according to the obel that is nearest to the screen (if it masks the other obel) or the other obel if it is not masked by the first obel (i.e. if the first is empty):

Obel 0 or 4 on imel 0, obel 1 or 5 on imel 1, obel 2 or 6 on imel 2 and obel 3 or 7 on imel 3. Conventionally, the obels 4, 5, 6 and 7, which are closest to the screen, respectively conceal the obels 0, 1, 2 and 3. We can thus establish the following rule: the obel number $Cn$ which is written on three bits "b2: b1: b0" is projected on the imel number "b1, b0", b2, b1 and b0 being the coordinates along $Oz'''$, $Oy''$ and $Ox''$ respectively.

The matrix of the pixels of the image obtained on the screen corresponds to all the imels of one and the same level of the quadtree. Thus the pixels of an image of 512×512 pixels will be reached at the level 8 of the quadtree, the first level being zero, which represents 4 imels in a quadtree of a node packet.

The sampling function of the overlay makes it possible to decide the value of the node of a target octree obel depending on its position in the object overlay. There are two possibilities depending on whether the obel in question is a leaf obel of the target octree or not.

It is accepted at the outset that the leaves of the target octree are always generated at a fixed level related to the size of the image. An obel is therefore a leaf obel if, and only if, it is at the last level.

Should the obel be a leaf obel, the value of the target obel is then "E" if the sampling value of the overlay at the center of the obel is "E", if not it is "F".

If the obel is not a leaf obel, a test is performed. This test will be called a "Bbox" (for bounding box) test in the rest of this description and is shown in the schematic drawing 8. Let a target obel 15 form part of a target 16 in an overlay 17. The Bbox 18 is the rectangular parallelepiped, the sides of which are parallel to the respective axes of the overlay 17, and which is circumscribed at the target obel (i.e. the edges of this parallelepiped pass through the tips of the target obel 15). The value of the target obel will be "E" if the sampling values of the overlay at all eight corners 19 (only four corners 19 are shown in FIG. 8 which is not a conventional projection on a plane) of the Bbox 18 are all equal to "E"; if not it will be "P". This test is correct only if the size of the Bbox in all its dimensions does not exceed the size of the obels of the overlay (i.e. 2000h for the child obels). Thus, it is certain that if a value "E" is decided upon, none of the descendants of the obel 15 could have any other value than "E" when following the same rule. Hence, these relative dimensions of the Bbox and the obels should be always verified. The target inclusion rule is then defined: the target should be included in the overlay, the dimensions of the Bbox of the target, along each of the axes of coordinates of the target, should be all smaller than 4000h.

To establish a geometrical relationship between the overlays of the object and the target octree, the method of the invention provides for the concurrent control of the routes of the overlays in the object and the route in the target octree, so that the levels there are identical at any moment, so that, at every level, the target obel is entirely included in the object overlay and so that, at every level, the size of the Bbox of the child obels of the target obel is smaller than 2000h.

Figure 9:
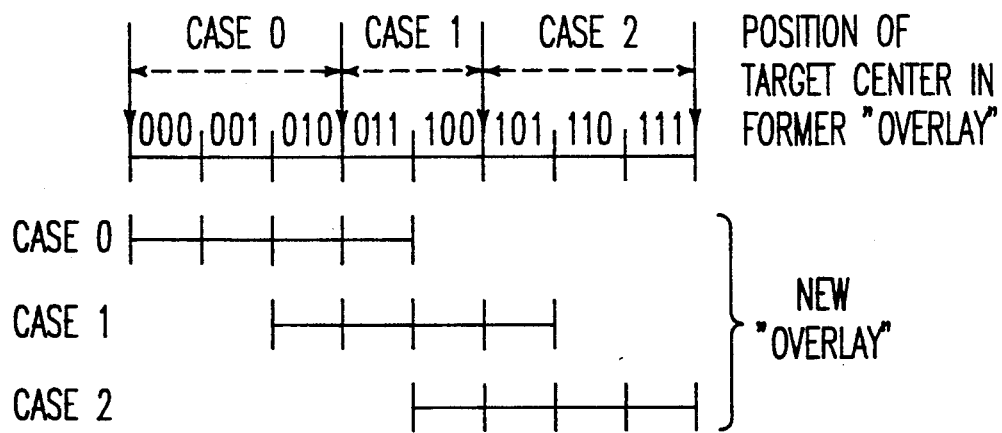

If these rules of the method of the invention are properly followed, the overlay of a child obel can be selected solely from the position of its center in the overlay. According to another rule of the method of the invention, the overlay chosen is the one with its center closest to the child obel's center (which will be called the child center). If, along one axis of coordinates of the overlay (and this rule is applied to each of the three axes of coordinates), the coordinate of the child center is strictly below 3000h, the zero case is decided upon; if this coordinate is greater than or equal to 3000h and strictly below 5000h, the case 1 is decided upon; if this coordinate is greater than or equal to 5000h, the case 2 is decided upon. This decision therefore results from the combination of the three most significant bits of the child center and requires no comparator. The coordinates of the child center in the new overlay selected become the new target center at the following lower level. This rule is illustrated by the diagram of FIG. 9 in which those bits of the child center having weights of 14, 13 and 12 are recorded. Thus, when the trinomial formed by the bits with weights 14, 13 and 12 of the child center is equal to "000", "001" or "010", we get the case 0. If it is equal to "011" or "100", we get the case 1. If it is equal to "101", "110" or "111", we get the case 2. The corresponding position of the new overlay (in a single dimension) has been shown in FIG. 9.

Figure 10:
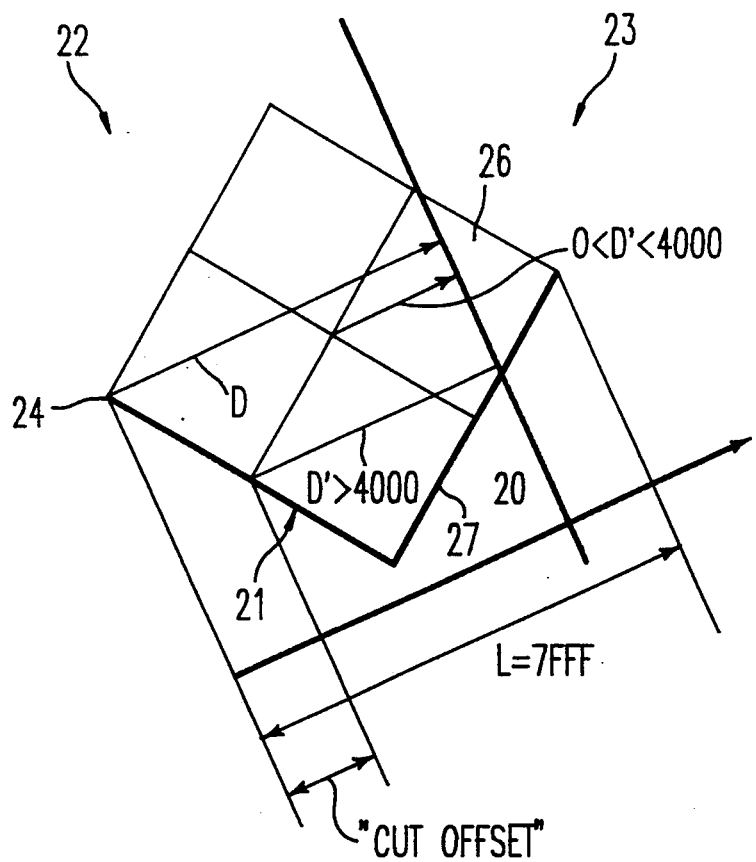
FIG. 10 is a diagram explaining the determination of slices according to the invention.

The method of the invention can also be used to represent 3D slices of objects. With the help of FIG. 10, we shall explain the geometry relating to the cut planes. The role of the cut planes is to decide whether a child of the current target obel is entirely on one side or the other of any fixed plane or whether it is cut by this plane. In FIG. 10, this cut plane is marked 20 and cuts the target obel 21. A distinction is made between the "interior" region 22 with respect to the plane 20, which is the region chosen for display, and the "external" region which must be eliminated. This decision is taken at a given level depending on the distance between the child obel in question and the plane 20. A number signed on 16 bits represents the distance D between the "innermost" corner, with respect to the plane, and the plane itself (namely the corner of the obel farthest from the plane 20 in the region 22). This number is standardized so that the distance L between the innermost corner 24 of the target obel and the "outermost" corner 25 (the farthest from the plane 20 in the region 23) is equal to 7FFF$_h$, i.e. the greatest positive number possible according to the conventions used. At a given level, we get the distance D between each of the child obels and the plane 20 by adding a signed offset, the value of which is independent of the level, owing to the said standardization. It is then easy to take a decision for the selected child obel, knowing this distance D':

If D' is smaller than or equal to 0 (in signed value), the child obel is entirely outside;

If D' is positive and smaller than 4000$_h$, the plane cuts the child obel (the case of the child obel 26) and, If D' is greater than or equal to 4000$_h$, the child obel is entirely inside (the case of the child obel 27 for example).

The new standardized distance for the selected child is simply twice the former distance. This new distance does not have to be calculated unless the obel in question is cut by the cut plane. For, if an obel is entirely on one side of a cut plane its children, if any, would also be on the same side of the plane.

To display the image of the examined object, the various pixels corresponding to the material that is a part of this object are painted. If, during the passage through the target octree, a leaf obel is assigned a value "F", it is decided to paint the corresponding pixel. The coordinates x and y of the pixel to be painted correspond to the coordinates x', y', z' of the obel in question, which are generated during the passage through the octree.

To pass through the target octree, the method of the invention entails the performance of a sequence of checking operations. In this sequence of checking operations, a decision is taken, at each level, on whether it is necessary to go down (this is called a push operation) in the octree and, if so, towards which child, or whether it is necessary to go up (this is called the pop operation) in the octree and whether the image should be painted.

In a given processing state, we know: the level of the object octree and the target octree, the current overlay, the geometrical position of the target in the current overlay and the status of the eight children of the current target, namely, whether they have already been visited or not. The method of the invention makes it possible, in a status, to sample the overlay at any point and, especially, to make either a Bbox test for one of the children or to decide whether or not to paint a child obel. When it is desired to eliminate the concealed parts, an already painted pixel causes the obels concealed by this pixel to be inactivated.

The above-mentioned push operation consists in: saving the current state of the processing, incrementing the level and calculating the new processing state for a specified child of the target obel as a function of the former state.

The pop operation referred to above consists in: decrementing the level and recovering the saved state of the processing at this level. The processing rule then is as follows, so long as the processing is not finished, if the current level is not the bottom level: to seek the first node of the current nodes packet that has not yet been visited and which passes the Bbox test, if a node of this type exists, to perform a push operation. If not, if we are at the top of the hierarchy, the processing operation is ended and if we are not at the top of the hierarchy, a pop operation must be performed. If the current level is the bottom of the hierarchy, the nodes of the current nodes packet must be projected by order of priority and the image must be painted as and when the projection is done, and then a pop operation must be performed.

The target octree is passed through firstly by giving priority to the obels closest to the screen (which defines the order of priority; this is the so-called "front to back" process). A function, which shall be called the "next" function, consists in then selecting the obels to be painted (in non-transparent mode) not masked by an already painted obel. Thus, an obel is not visited unless it is really projected on the screen. In the transparent mode, all the non-empty obels of the object are visited.

Figure 11:
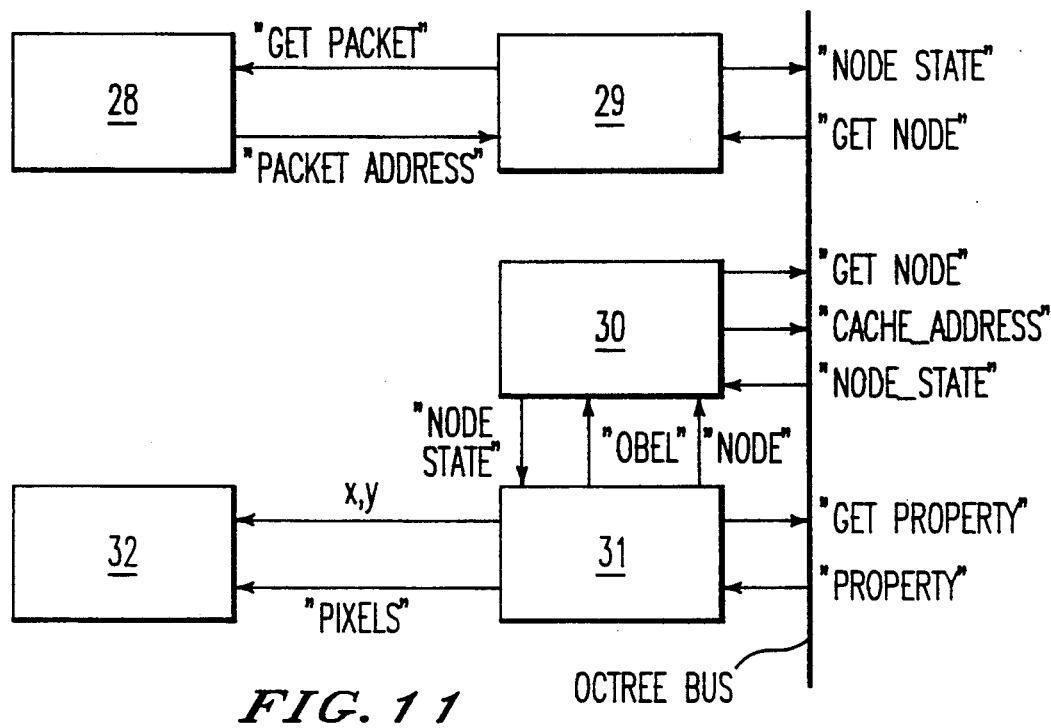
FIGS. 11 is a simplified block diagram of the device according to the invention.

We shall now describe an embodiment of the device for the application of the invention. The block diagram of a device of this type is shown in FIG. 11.

This device comprises essentially: an octree memory 28, an octree cache memory 29, a geometrical processor 30 and an image generator 31 with its associated memory 32. The elements 29, 30, 31 are connected to the octree bus, comprising an address bus, a data bus and two commands, namely "get mode" and "get property" described below.

The octree memory 28 stores the octree representing the object to be displayed. This memory is accessed only during reading for the entire subsequent processing operation that concerns the same object. The octree is stored in the memory 28 in a form which makes it possible to pass through it quickly along every route. All the data to be processed by the geometrical processor are stored, again according to the same data structure, so that it can be processed easily and quickly. The volume of data to be stored may vary, depending on the object to be displayed, from 1M 32-bit words ($2^{20}$ words) to 32M 32-bit words. The making of this memory and the means used to obtain the octree are not part of the invention since they have already been described in the publications referred to above. It shall be simply said that this memory is a RAM of 32-bit words.

The function of the octree cache memory 29 is to provide the data very quickly to the geometrical processor 30. While the octree memory 28 is accessed by blocks of words, the cache memory 29 is accessed for a packet of nodes (16 bits) or for a property (32 bits). Owing to the structure of the data in the octree memory, the rate of presence of data in the cache memory 29 is very high, i.e. most of the data needed by the processor at any instant are in this cache memory.

The geometrical processor 30, which will be described in detail below, provides for the application of the method of the invention and, in particular, it is the said geometrical processor which decides the passage through the octree.

The image generator 31 calculates the value of the pixels to be painted under the supervision of the processor 30. A pixel at a given position in the image is calculated only once. The image is generated in a frame buffer, described below with reference to FIG. 25. This frame buffer is capable of storing a complete image which, in one mode of embodiment, is a RAM with $512 \times 512$ 32-bit words (for images of $512 \times 512$ pixels).

Figure 12:
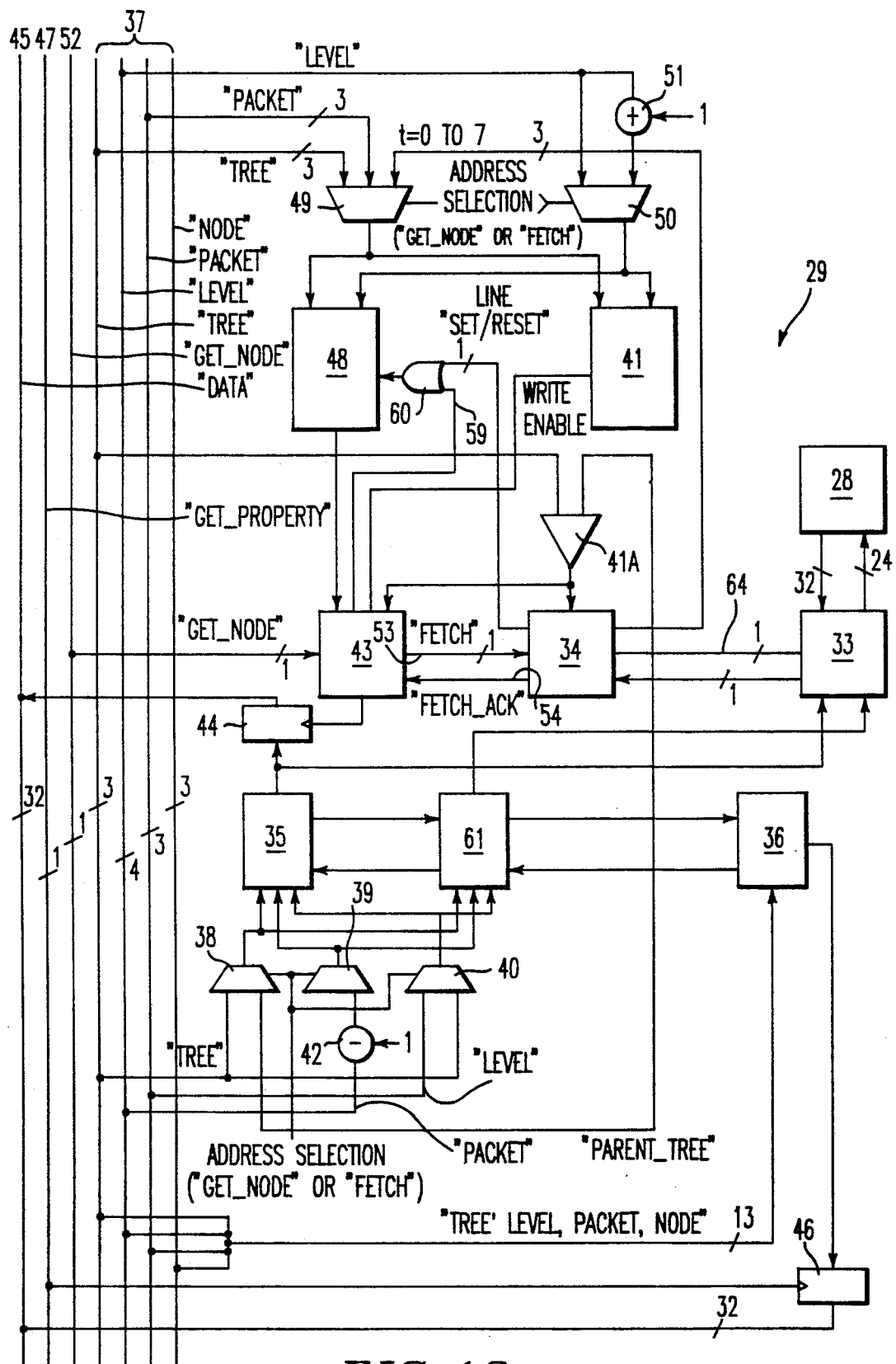
FIGS. 12 and 15 to 26, 27A, 27B, 28 and 29 are drawings of parts of the device of FIG. 11, and FIGS. 13, 14 and 30 are diagrams that explain the working of certain circuits of the device of FIG. 11.

The octree cache memory has been shown in detail in FIG. 12.

Figure 14:
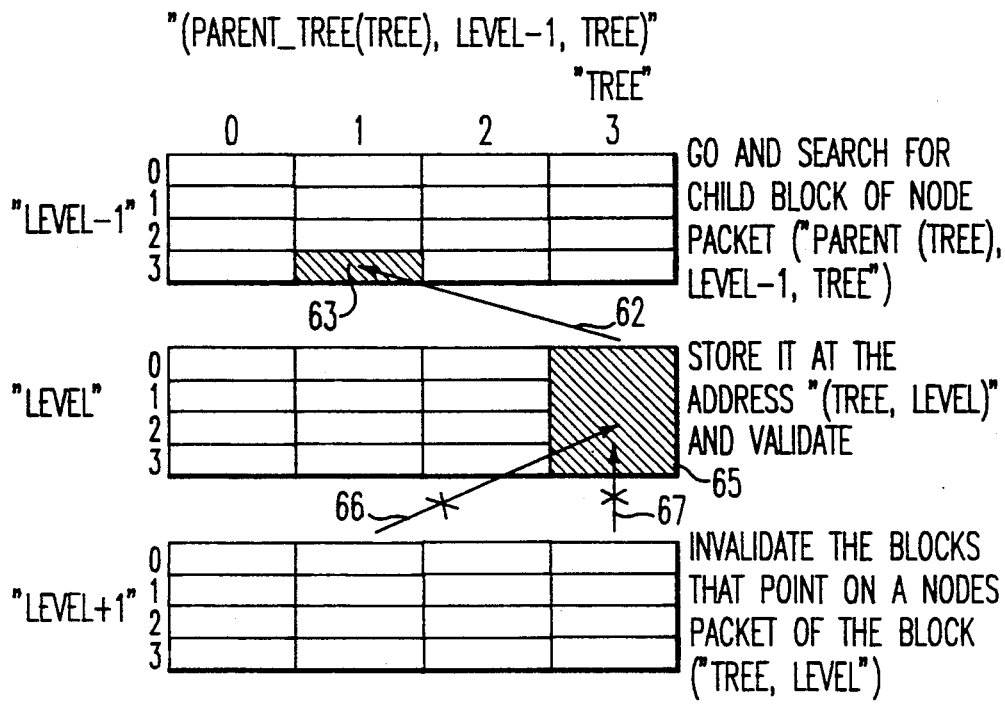

The octree memorized in the memory 28 is accessed during reading by a block reader 33, under the control of a sequencer 34 (controlling the "fetch" function) and described below with reference to FIG. 14.

The function of the sequencer 34 is to load, at the request of the geometrical processor 30, the values read in the octree memory in both cache memories proper, 35, 36 (connected to the reader 30) by blocks of node packets. These data are then re-addressed, during reading, in the memories 35, 36, so as to directly give the values expressed in the "tree, level, packet, node" form, according to the requirements of the geometric processor which can therefore exploit these data directly.

The memory 35, which is called a node packets memory, is a memory capable, in the present case, of storing 1024 packets of nodes (on 16 bits) organized in eight trees, sixteen levels and eight packets. The addresses of the said eight trees, sixteen levels and eight packets are present at the octree addresses bus 37 under the respective names "tree" on three bits, "level" on four bits and "packet" on three bits. Thus, each level can store 64 packets of nodes. The geometrical processor 30 selects eight packets of nodes at the current level, out of these 64 packets, to form the current overlay. A block of node packets is stored at an address (given by the tree and level data), with the packet address data varying between 0 and 7. The addressing inputs of the memory 35 are connected to the outputs of three multiplexers 38 to 40 having two inputs each. A first input of the multiplexer 38 is connected to the tree addressing lines of the bus 37 and its other input is connected to the output of a stack 41 giving the parent tree address on three bits. A first input of the multiplexer 39 is connected to the "level" addressing line of the bus 37 and its other input is connected to the output of a transcoder 42, the input of which is connected to the same "level" addressing lines of the bus 37. The transcoder 42, which is made by means of a read-only memory for example, gives a "level-1" address using the "level" address. The programming of a memory of this type is obvious to the specialist. An input of the multiplexer 40 is connected to the packet addressing lines of the bus 37, and its other input is connected to the tree addressing lines of the bus 37. The inputs of the controls of the multiplexers are connected to the "select address" outputs of the sequencer 34 and the sequencer 43 controlling the "get node" function.

The output of the memory 35 is connected through a register 44 to the data bus 45 (belonging to the octree bus). The clock signals input of the register 44 is connected to an output of the sequencer 43.

The memory 36, which is called a "properties memory", is, in the present case, a memory with sufficient capacity to store 8192 properties organized in eight trees, sixteen levels, eight packets and eight nodes, these data being present at the addresses bus 37 under the names "tree", "level", "packet" and "node" (the node data are on three bits). The properties of a packet of nodes stored at an address (defined by the above-mentioned tree, level and packet data) are stored at addresses given by the tree, level and packet data, with the node address data varying between 0 and 7. The memory 36 is addressed by the tree, level, packet and node lines of the bus 37 and its output is connected through a register 46 to the data bus 45. The clock signals input of the register 46 is connected to the "get property" line 47 which is a part of the octree bus.

The data thus addressed are managed in the cache memory 29 by a validating bit and the parent-tree stack 41 created, for example, by means of a RAM. The validating bit produced by a RAM 48, addressed by the tree and level data, indicates that the block of node packets of the same address is valid, i.e that the data contained in this block can be sent to the geometrical processor 30. The addressing inputs of the memories 48 and 41 are connected to the outputs of two multiplexers 49, 50 having three inputs each. The first two inputs of the multiplexer 49 are connected to the tree and packet lines of the bus 37 and its third input is connected to an output (on three bits in the present example) of the sequencer 34, giving a tree datum that varies between 0 and 7.

A first input of the multiplexer 15 is connected to the level lines of the bus 37, its second input is connected, through a transcoder 51, to the same level lines. The transcoder 51, which is made, for example, with a read-only memory, gives the "level+1" data using the "level" datum. The third input of the multiplexer 50 is connected in the same way as the third input of the multiplexer 49. The control inputs of the multiplexers 49, 50 are connected to the "select address" outputs of the sequencers 42, 43. The pointer of the parent-tree RAM 41 gives, for each block, the address of which is given by tree and level, on the bus 37, the datum of the tree number corresponding to the parent nodes packet of the previous level. The address of a nodes packet is, as specified above, the triplet of data (tree, level and packet data). The addresses of the properties of the nodes of this packet are given by (tree, level, packet and node), with node taking the values 0 to 7 depending on the node number considered. This nodes packet, constituting the children of the node having the node address of a nodes packet located at the address (tree, level, packet) will be at the address (packet, level+1, node). This addressing mode makes it possible to manage, at a given level of the cache memory, blocks of nodes packet which do not share the same parent. This is necessary for these blocks to correspond to one and the same overlay. The cache memory is controlled by the "get node" and "get property" signals, on one bit each, which are given by the links 52 and 47 of the octree data bus and which respectively reach the sequencer 43 and the register 46.

When the "get node" signal is activated, the cache memory 29 reads the addresses of the nodes packets (tree, level, packet) that are present at the bus 37. The cache memory 29 then performs the following steps: the memory 48 ascertains that the address block (tree, level) is valid. If it is not valid, it so informs the sequencer 43 which activates the "fetch" function to search for the right block by sending a signal through the link 53 to the sequencer 34 while awaiting an acknowledgement signal from the said sequencer 34 through the link 54. This activation of the "fetch" function is depicted schematically at the top of FIG. 13 and repeated in detail in FIG. 14. The pointer 55 of the memory 41, under the control of the sequencer 34, is positioned on the parent nodes packet giving, according to the addressing rule explained below, the valid address of the children nodes packet 57. As soon as it has received the acknowledgement signal on the link 54, the sequencer 43 commands the addressing (in terms of tree, level and packet) of the memory 35, through the select address signal link and one of the multiplexers 38 to 40. The said sequencer 43 then activates the register 44 which sends the corresponding nodes packet on the bus 45 (the middle diagram in FIG. 13 for the nodes packet 57).

Figure 13:
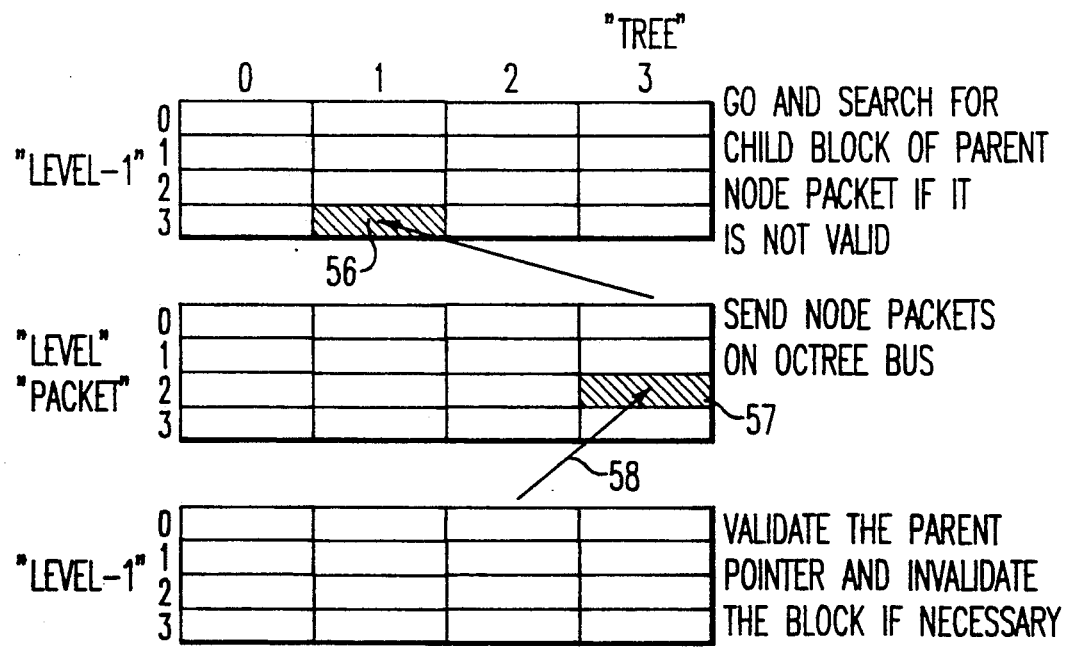

Subsequently, the sequencer 43 controls the new addressing of the memories 48 and 41 (packet, level+1, address), through the "select address" link and the multiplexers 49 and 50, to update the parent-tree pointer in 41 of the higher level block according to the rule for addressing the address (packet, level+1), namely that if, as illustrated in FIG. 13, the packet sent is the number 2 of the "level" level, the children block is stored in the tree 2 of the "level+1" level. If there is a valid block at this address for another parent pointer, it is invalidated through the command 59 and the OR 60, and the sequencer 43 positions the pointer 58 at the correct tree address.

As regards the "get property" function, no validity check is conducted in response to a "get property" signal (one-bit signal on the link 47) since, in the properties block, the various properties are arranged in the order of the corresponding nodes, and since their addresses are linked. The memory 36 then gives the property corresponding to the address (tree, level packet, node) available at this moment on the bus 37, through the register 46 which is activated by this "get property" signal.

Upon a "fetch" request (emitted by 43) of a block at the address (tree, level), the sequencer 34 commands (via "select") the addressing, at tree, level of the memories 41 and 48, by the multiplexers 49, 50 to obtain the parent tree number. Then the said sequencer 34 commands (via "select address") the addressing at parent-tree, "level-1", tree by the multiplexers 38 to 40 of the memory 34 to read the parent nodes packet according to the addressing rule referred to above. In FIG. 14, the pointer 62 is pointed towards this parent packet 63. Then the sequencer 34 reads the absolute address in the octree memory of the block (tree level) in the memory 61. The memory 61 is linked to the outputs of the three multiplexers 38 to 40 and receives, from the read block 33, the addresses of the blocks that pass through it. The memory 61 uses the current address (relative address) of the nodes and corresponding offsets to establish the absolute address of these nodes.

Then, the sequencer 34 activates the reader 33 through the 1-bit link 64. The reader 33 sends, to the memories 35, 61 and 32, the nodes packet data, the block address data and the property data respectively, these said data being sent to the absolute addresses (tree, level packet varying from 0 to 7 and node varying from 0 to 7). FIG. 14 shows the child block of the packet 63 at 65. This child block is stored at the address (tree, level), where the sequencer 34 validates it. Then the sequencer 34 selects (through the "select address" link of the multiplexers 50 and 49) the addresses ("t"=0 to 7, "level+1") of the memories 41, 48. Subsequently, it invalidates the blocks of the "level+1" level if parent-tree is different is from tree. This is done by the comparator 41a (the inputs of which are linked to tree of the bus 37 and to the output of the stack 41 and the output of which is connected to the sequencers 34 and 43), namely it invalidates the blocks which were valid for a packet of parent nodes belonging to the block (tree, level, block 65 in FIG. 14). In FIG. 14, this invalidation is symbolized by crosses on the pointers 66, 77 pointing to the block 65. For, since this block has been modified, the higher level blocks (level+1) which are linked to it, are no longer valid. Finally, the sequencer 34 sends an acknowledgement signal to the sequencer 43 on the link 54 and awaits another "fetch" signal through the link 53. The sequencer 43 then starts its process again, i.e., the process described above after reception of the acknowledgement signal.

The validity of the block is managed automatically. The following commands are authorized from the level 0 onwards:

the dispatch of a "get node" command for addresses defined by (tree, level, packet) for every level (level) between 0 and the current level (last level requested).

The dispatch of a "get property" command for all the addresses defined by (tree, level, packet, node), of a level lower than the current level, for which the "get node" command for the address (tree, level packet) has been done previously.

Figure 15:
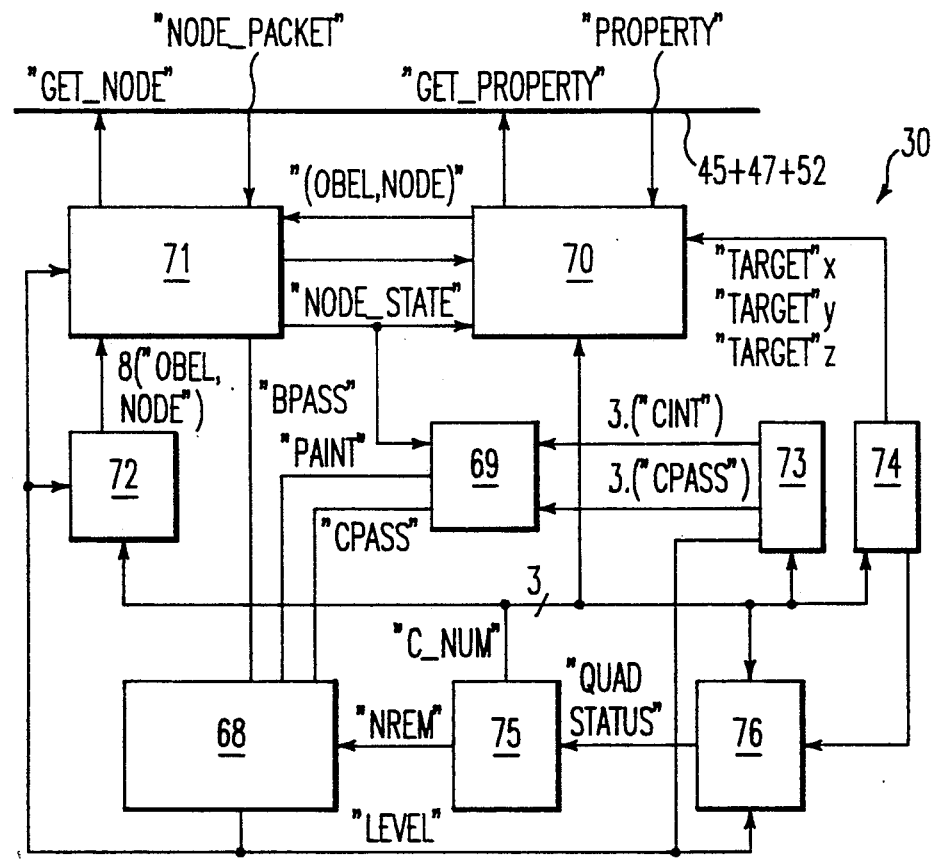

FIG. 15 shows the functional block diagram of the geometrical processor 30 with the single octree data bus 45 and the "get property" command 47 and the "get node" command 52.

The geometrical processor comprises firstly, a sequencer 68 which manages the various stages of the method of the invention. The sequencer 68 goes through five fundamental statuses marked Status 0 to Status 4.

Stage 0: this is the "Bbox" test. In this status, the sequencer commands the execution of the "Bbox" test for a specified child of the target obel with the aim of evaluating it. The test will be positive if the value of this child is not "E".

Status 1: "push" function. The sequencer commands the execution of a "push" for a specified child of the target obel if the Bbox test is positive. The processor then chooses the child overlay and calculates the new coordinates of the new target.

Status 2: "pop" function. The sequencer commands the execution of this function when all the children of the current target obel have been visited.

Status 3: "test paint" and image generation function. When the image pixels have to be painted, the sequencer activates the "image generation" function which calculates the value to be assigned to the current pixel. The two obels hidden by the painted pixel are inhibited and will, therefore, no longer be visited.

Status 4: "next". In this status, the sequencer determines the next children of the current obel to be visited.

The sequencer as well as the other elements of the geometrical processor are controlled by the following variables (FIG. 15):

"c-num": number of the child of the standard obel to be visited (this number varies from 0 to 7).

"n-rem": validity bit of the variable "c-num". If this bit is at 0 it means that there are no more children of the current obel to be visited.

"level": current level of target octree.

"bottom": Boolean number, true if "level" corresponds to the bottom of the octree.

"top": Boolean number, true if "level" corresponds to the summit of the octree (level 0).

"bpass" and "cpass": Boolean number, true if the child with the "c-num" number of the current obel is to be visited.

"paint": Boolean number, true if the child with the "c-num" number of the current obel is to be projected on the image.

The starting status at the initialization of the sequencer is the status 0, for which "level" =0 (variable "top" true) and "c-num" is the number of the first child to be visited (variable "n-rem"=1). Typically, for the embodiment with a resolution of 512×512, we then get "c-num"=7.

The only transitions possible among the various status (reference E0 to E4) of the sequencer are as follows:

E0→E1: "bpass" and "cpass" are true.
E0→E4: "bpass" or "cpass" is false.
E1→E0: "bottom" is false.
E1→E3: "bottom" is true.
E3→E4: is still true (from E3 we must necessarily go to E4)
E4→E3: "bottom" is true and "nrem" is true.
E4→E2: "top" is false and "nrem" is false.
E4→E0: "bottom" is false and "nrem" is true.
E4→end "top" is true and "nrem" is false.

The processor 30 has a RAM memory 69 that performs the "test paint" function.

The "test paint" function (Status E3) commands the sampling of the overlay by the current child obel (with a number indicated by "c-num"). The paint value is deduced from the corresponding node status. In the present embodiment, the nodes which are in the status F are painted. The image generation function is activated if "paint" is true, then the "c-num" bit or "c-num-4" bit (if c-num is greater than 3) of the "quad status" register is validated.

The image generation function (block 70 of FIG. 15) shall be described below with reference to FIG. 25.

The "Bbox test function" does the sampling of the overlay for the eight corners of the child of the current obel. If one of the node status signals is not null, the Boolean number "bpass" is true. This function is part of the set of functions marked 71 in FIG. 15, and is explained in greater detail below with reference to FIG. 24.

The push function explained below with reference to the general FIG. 16 in particular, consists in saving the target status and target center status registers (see FIG. 17) in their stacks corresponding to the current level, saving the quad status register (see FIG. 20) in the quadtree memory at the current level, at the target x, target y address, assembling the new overlay, calculating the new values of target center and target x, target y, target z, incrementing the current level, reading the new value of the quad status at the new current level and at the new target x, target y address and initializing the new target status according to the new quad status, the new "c-num" being then available (see FIG. 18).

The "pop" function (see FIG. 16) consists in saving the quad status register in the quadtree memory at the current level, at the target x, target y address. If its value is FF is hexadecimal notation, the value c-num (the two least significant bits of which suffice) of the child imel to be condensed is chosen, then the current level is decremented, the target status, target center registers are loaded from their respective stacks at the new current level, the new target x, target y and target z values are calculated, the new quad status value is read at the new current level, at the new target x, target y address and the condensation is done if necessary.

The geometrical processor 30 further has a geometry function 72 explained below with reference to FIG. 17, a cut plane function 73 explained below with reference to FIG. 19, a set 74 of three registers that respectively give the target x,. target y and target z addresses of the target obel, a "next" function 75 explained below with reference to FIG. 18, and a quad-tree read/write function 76 explained below with reference to FIG. 20.

The status of the geometrical processor 30 at a given level is described by the following registers and stacks:

Four-bit quad status register (see FIG. 20) giving the status of the current imel of the quadtree.

Three-bit c-num register (see FIG. 18) giving the number of the child of the current obel to be visited.

Target center register with 3×16 bits (for the three axes) giving the coordinates of the center of the current target obel in the reference of the current overlay.

Last c-num stack memorizing all the c-num already visited for all the lower levels.

Target center stack storing all the values of the target center for all the lower levels.

Quad tree memory storing all the quad statuses of the quadtree image.

Figure 16:
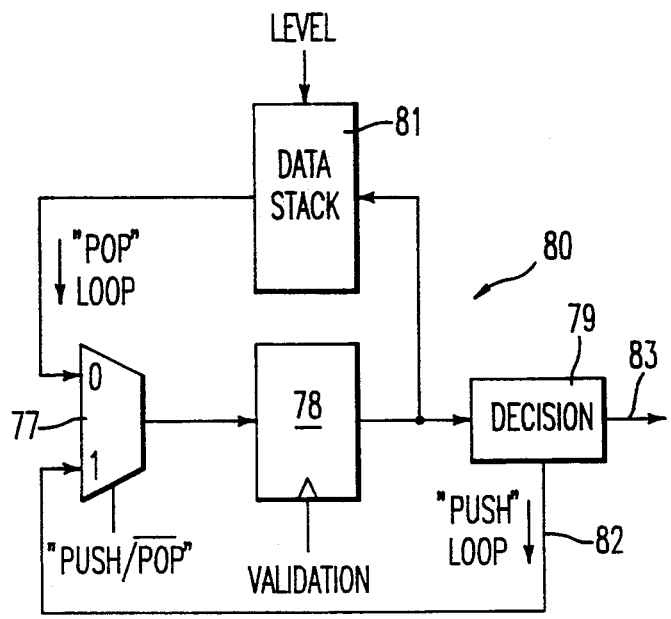

FIG. 16 gives the schematic diagram of the circuit using the push function or the pop function depending on the push/pop command applied to a multiplexer 77. The output of the multiplexer 77 is connected to the input of a register 78, the clock signals input of which receives a validation signal. The output of the register 78 is connected, firstly, to a decision function 79 and, secondly, to a first input of the multiplexer 77 by a pop loop 80 comprising a stack 81 of data addressed by a level value. An output of the decision function is connected by a push loop 82 to the second input of the multiplexer 77. Another output 83 of the function 79 gives various variables (see FIGS. 17 to 19).

Depending on the circuits in which this push/pop function is inserted, the register 78 contains the current last c-num, target center or cut plane data useful at the current level. At a push command, the register is saved in a memory (stack 81) addressed by the value of the level which will be vacated, then the new value of the register is calculated from the former value. At a pop command, the register 78 is loaded by the value read in the memory 81 at the address of the level which will be reached.

Figure 17:
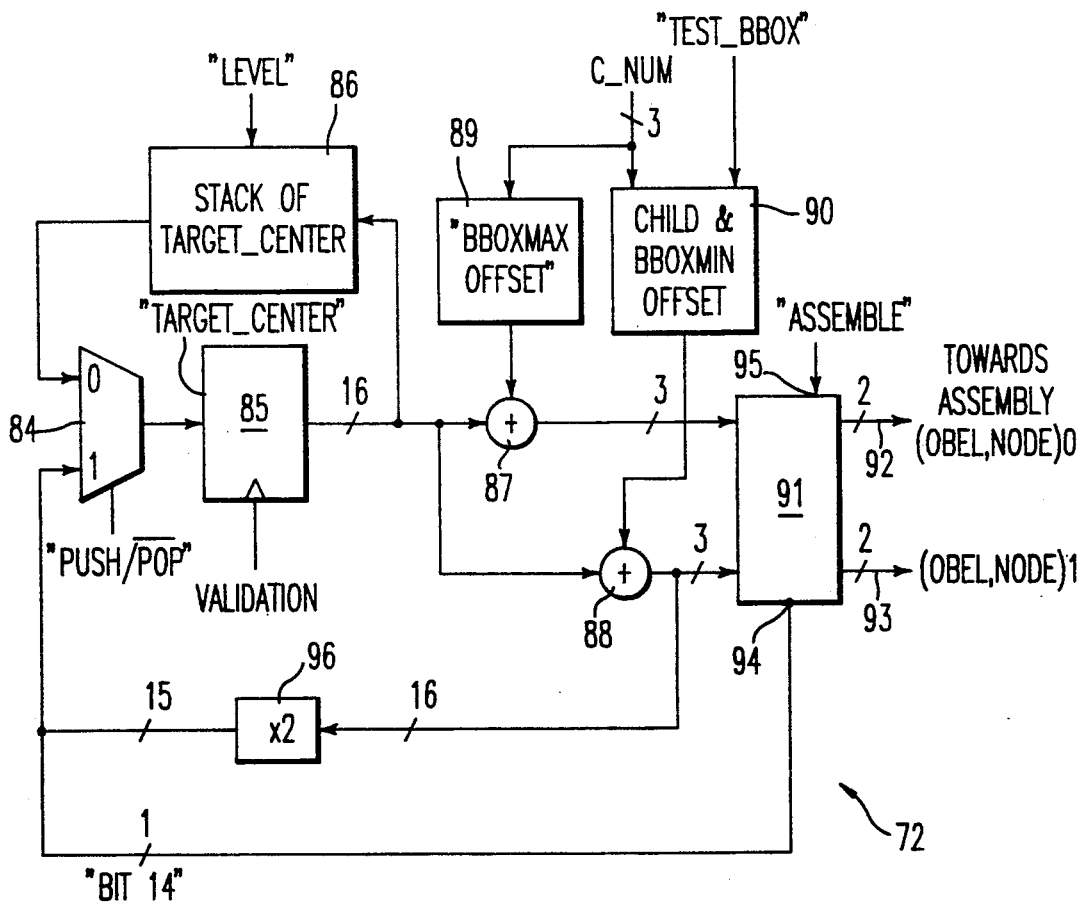

The geometry function shown in FIG. 17 does the sampling of the overlay. It consists of three identical parts for each of the three coordinates x, y, and z.

The output of a multiplexer 84, commanded by the push/pop signal, is connected to the target center register 85. The output of the register 85 is connected, firstly, to an input of the multiplexer 84 through a RAM 86 forming a stack of target center values and, secondly, to the inputs of two adders 87, 88, the other inputs of which are respectively connected to the outputs of random-access memories 89, 90. The memory 89 memorizes the maximum offset values of the corners of the Bbox with respect to the target center, and is addressed by the variable c-num relating to the target. The memory 90 memorizes the minimum offset values with respect to the target center of the Bbox and the child obel center, and is addressed by the c-num of the target and by the Bbox test signal.

The register 85 contains the coordinates of the current target obel center in the reference of the current overlay. At the output of the adders, the coordinates of the child obel center are obtained, the offset of the said child obel center being selected by the variable c-num or the coordinates of the eight corners of its Bbox. The most significant bits (weights 14, 13) of the coordinates of the child obel give the obel and node numbers of the overlay that has to be processed. The eight obel and node addresses of the eight corners of the Bbox are calculated in a single operation by applying the relationship No. 1 cited above with respect to the sampling of the overlay.

The outputs of the adders 87, 88, are connected to a combinational circuit 91 with three outputs marked 92, 93, 94 and a control input 95. The output of the adder 88 is connected through a circuit 96 that multiplies by two (this is, in fact, an elimination, by wiring, of the least significant bit) to the second input of the multiplexer 84, to which is also connected the output 94 of the circuit 91.

The new target center is calculated according to the relation No. 2 given above with reference to the coordinates of a child overlay. The bit with a weight 0 of the new center of the target is always null. The bits with a weight of 1 to 13 are the former bits with a weight of 0 to 12, this operation being performed by a simple leftward shift (i.e. the multiplication by two referred to above). The bit with a weight of 14 is determined depending on the case of the new overlay, hence, depending on the former bits with a weight of 12, 13, 14 according to the following table.

| Former bits b 14: b 13: b 12 | 000 | 001 | 010 | 100 | 011 | 101 | 110 | 111 |
|---|---|---|---|---|---|---|---|---|
| New bit b 14 | 0 | 0 | 1 | 0 | 1 | 0 | 1 | 1 |

During a push, the "assemble" command validates the values ("obel", "node") needed to calculate a new overlay. Depending on the position of the target center in the former overlay, the eight addresses ("obel", "node") are calculated at a rate of two per axis of coordinates of the eight nodes of the former overlay to form the new overlay according to the following table:

| Child center b 14: b 13: b12 | OBEL 0 | | OBEL 1 | |
|---|---|---|---|---|
| | Obel | Node | Obel | Node |
| 000 | 0 | 0 | 0 | 1 |
| 001 | 0 | 0 | 0 | 1 |
| 010 | 0 | 0 | 0 | 1 |
| 011 | 0 | 1 | 1 | 0 |
| 100 | 0 | 11 | 1 | 0 |
| 101 | 1 | 0 | 1 | 1 |
| 110 | 1 | 0 | 1 | 1 |
| 111 | 1 | 0 | 1 | 1 |

The "case" variable available on two bits at the output 92, needed for the selection of the new overlay (see description of FIG. 9 above) is the concatenation of the "obel:node" variables of the obel 0.

The "assemble" command signal (on one bit) commands either the sampling of the overlay by the output 93 (in Bbox "test" and in "paint" function) or the assembling mode, through the output 92, where the case number is available, and at the output 94 where the new bit, with a significance of 14, of the target center is collected.

Figure 18:
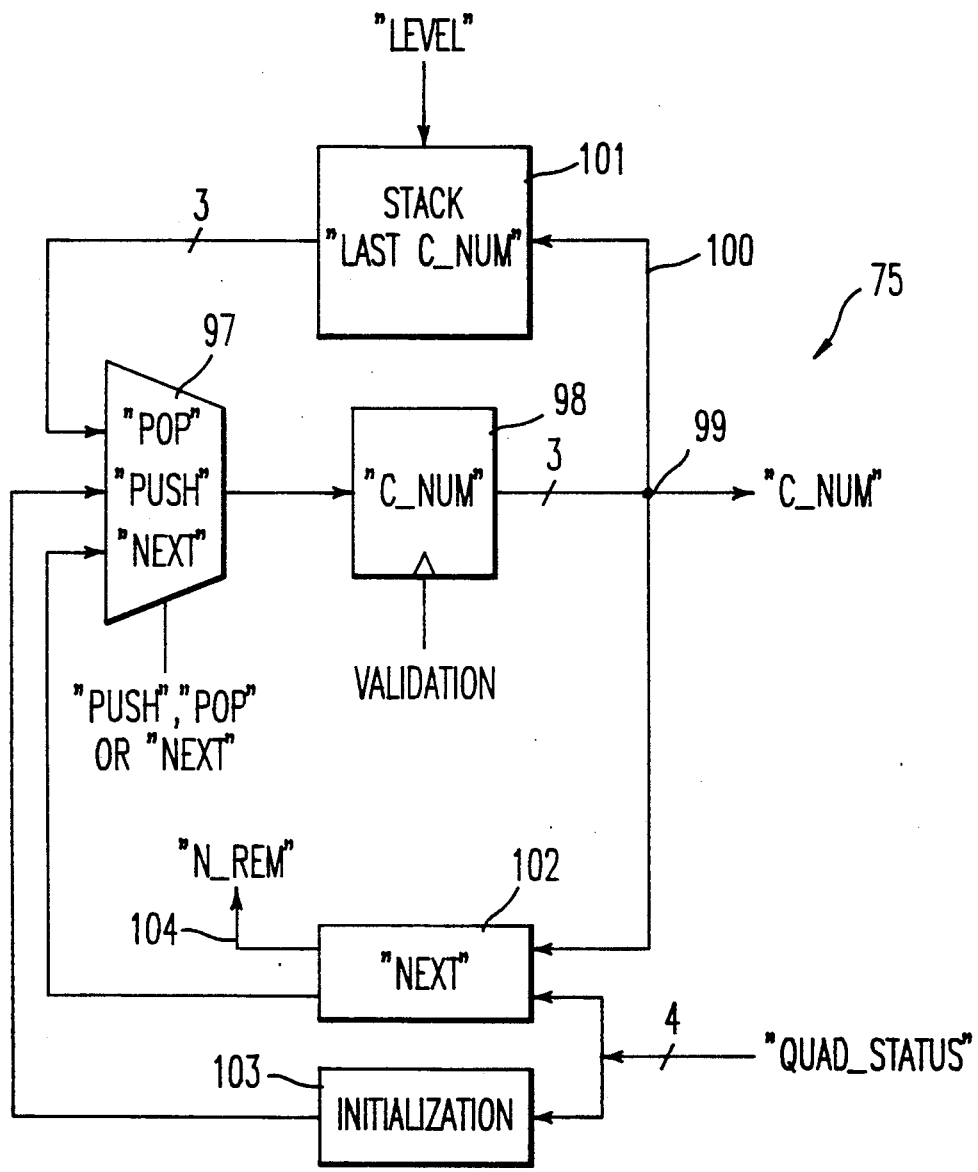

FIG. 18 shows the "next" function 75. It has a three-input multiplexer 97, the output of which is connected to a register 98 (memorizing "c-num", i.e. one of the eight children of the target). The output 99 of the register 98 is connected to a first input of the multiplexer 97 by a "pop" loop 100 comprising a stack 101 addressed by the "level" values. The output of the register 98 is also connected to an input of a "next" programmable circuit 102, another input of which receives the quad status signal coming from the circuit 76. The output of the circuit 102 is connected to another input of the multiplexer 97. Furthermore, the quad status signal is sent to an initializing circuit 103, the output of which is connected to the third input of the multiplexer 97. At another output 104 of the circuit 102, there is the variable "n-rem" which is sent to the sequencer 68.

The register 98 contains the number (c-num) of the child obel to be visited. The circuit 75, when activated (by the "validation" signal sent to the clock signals input of the register 98), computes the new "c-num" according to the last c-num visited and according to the status of the quad status signal invalidating the child obels already visited. If there are no longer any children left to be visited, the Boolean variable "n rem" changes to "false". The push command initializes the value of "c num" depending on the quad status value. The pop command makes it possible to recover the last "c num", which has been visited at the new level, from the stack 101. An activation of the "next" function then validates the next "c num" to be visited.

Figure 19:
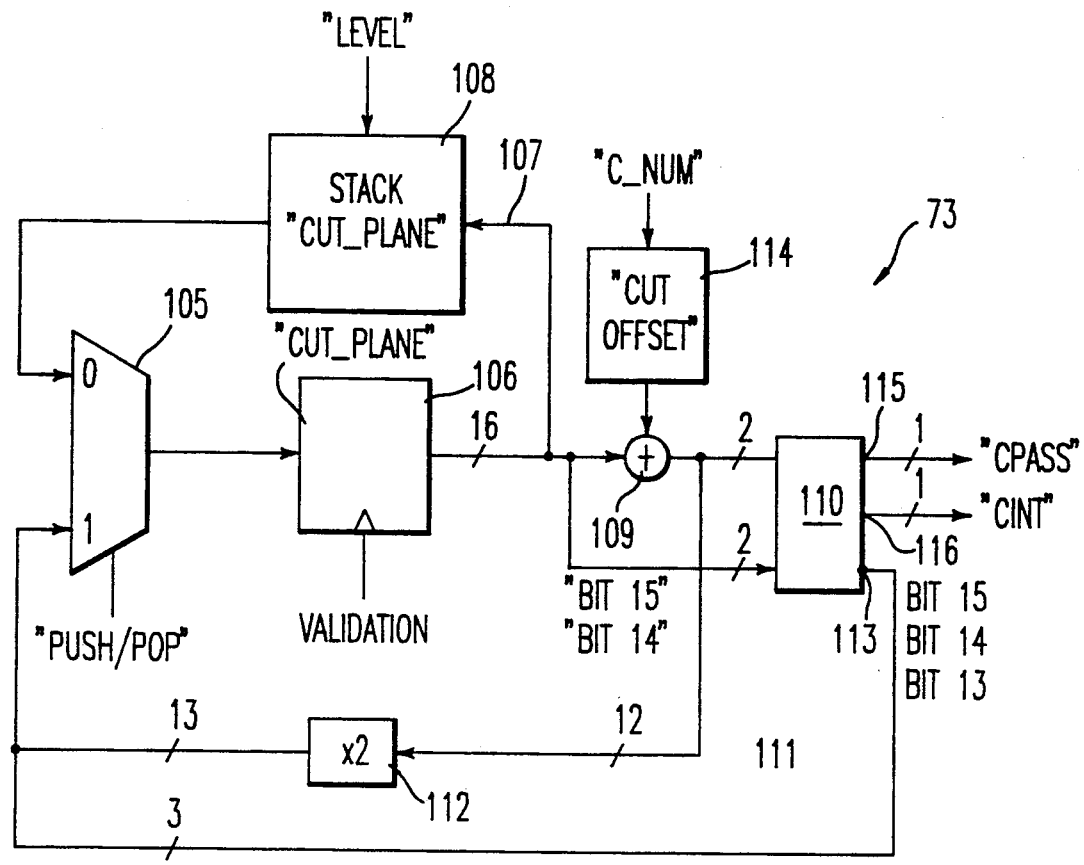

The circuit 73 that determines the cut plane of FIG. 19 comprises a multiplexer 105, controlled by the push/pop signal, the output of which is connected to a register 106. The output of the register 106 is connected, firstly, by a pop loop 107, comprising a stack 108, addressed by level, to an input of the multiplexer 105, secondly, to an input of an adder 109, and thirdly to an input of a logic circuit 110 to decide the cut plane. The output of the adder 109 is connected to another input of the circuit 110 as well as to the other input of the multiplexer 105 through a "push" loop 111 comprising a multiplier by two 112 (leftward shift), one output 113 of the circuit 110 being also connected to this other input of the multiplexer 105. A cut plane offset memory 114, addressed by "c num", is connected to the other input of the adder 109. The circuit 110 comprises two other outputs (on one bit), 115, 116, at which the "c-pass" and "c-int" variables, are available.

The register 106 contains the value of the distance D' defined above.

The value of the distance D for the child obel selected by the variable "c-num" is obtained at the output of the adder 109. The position of the obel with respect to the cut plane is determined by the two bits forming the "cpass" and "cint" variables: "cpass" is true if the child obel is not completely outside the plane and "cint" is true if the child obel cuts the plane.

The new value introduced into the register 106 for the next level is the value of the distance of the selected child obel multiplied by two, and a specific decision is taken by the circuit 110 for the new bits 14 and 15 to stabilize the decision when the plane no longer cuts the obel. The circuit 110 is programmed according to the following table.

|  | parent b15:b14 | child b15:b14 | cpass cpass | cint cint | new b15:b14 |  |
| --- | --- | --- | --- | --- | --- | --- |
| the | 00 | 00 | 1 | 1 | 0:b13 | the plane |
| plant | 01 | 00 | 1 | 1 | 0:b13 | cuts the child |
| cuts | 01 | 01 | 1 | 0 | 10 | the child goes inside |
| the | 00 | 11 | 0 | 0 | 11 | the child |
| parent | 01 | 11 | 0 | 0 | 11 | goes outside |
| the | 10 | 00 | 1 | 0 | 10 | the child |
| parent is | 10 | 01 | 1 | 0 | 10 | stays |
| inside | 10 | 10 | 1 | 0 | 10 | inside |
|  | 10 | 11 | 1 | 0 | 10 |  |
| the | 11 | 00 | 0 | 0 | 11 | the child |
| parent | 11 | 01 | 0 | 0 | 11 | stays |
| is | 11 | 10 | 0 | 0 | 11 | outside |
| outside | 11 | 11 | 0 | 0 | 11 |  |

Figure 20:
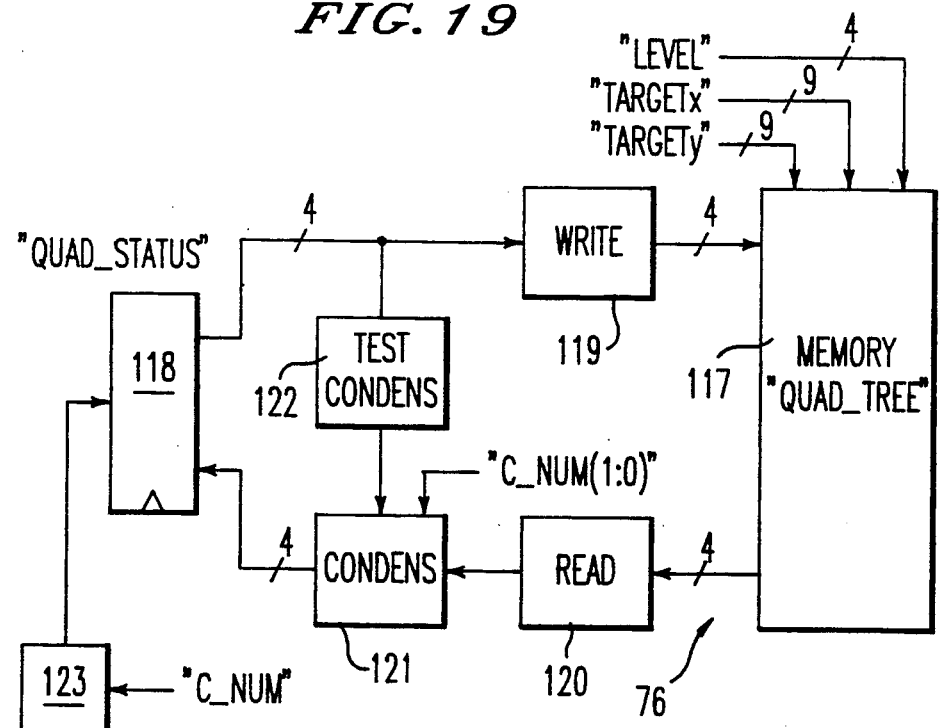

FIG. 20 shows the diagram of the circuit 76 with the quadtree memory. This memory 117 is addressed by the target x, target y and target z coordinates of the target obels and by level. The memory 117 receives its data from a four-bit register 118 through a write circuit 119, and it is read by a read circuit 120 which is connected to a condensation circuit 121 which is connected, furthermore; to a condensation testing circuit 122 which is itself connected to the bits of the register 118. The four bits of the register 18 may be positioned at "1" by a circuit 123 that receives, firstly, the variable c-num and secondly, a control signal produced by the quadtree updating circuit (upd quad) 157 described below.

The register 118 of the quadtree (quad status) contains the status of the current imel (painted or not painted). This register is modified in two ways:

If the level is the bottom, each time that a pixel is painted, the bit representing it is put at "1". During a pop operation, a condensation step is performed. This step consists in allocating the value "1" (painted) to the imel of which all the children have been painted.

During a push or a pop operation, the former quad status values are saved in the memory 117 at the former level and at the former target x, target y address, and quad status is initialized by the value read at the new level and at the new target x, target y addresses. During a pop, it is further necessary to perform a condensation if the former value of the quad status is F (F hexadecimal=1:1:1:1 in binary notation), namely entirely painted.

Figure 21:
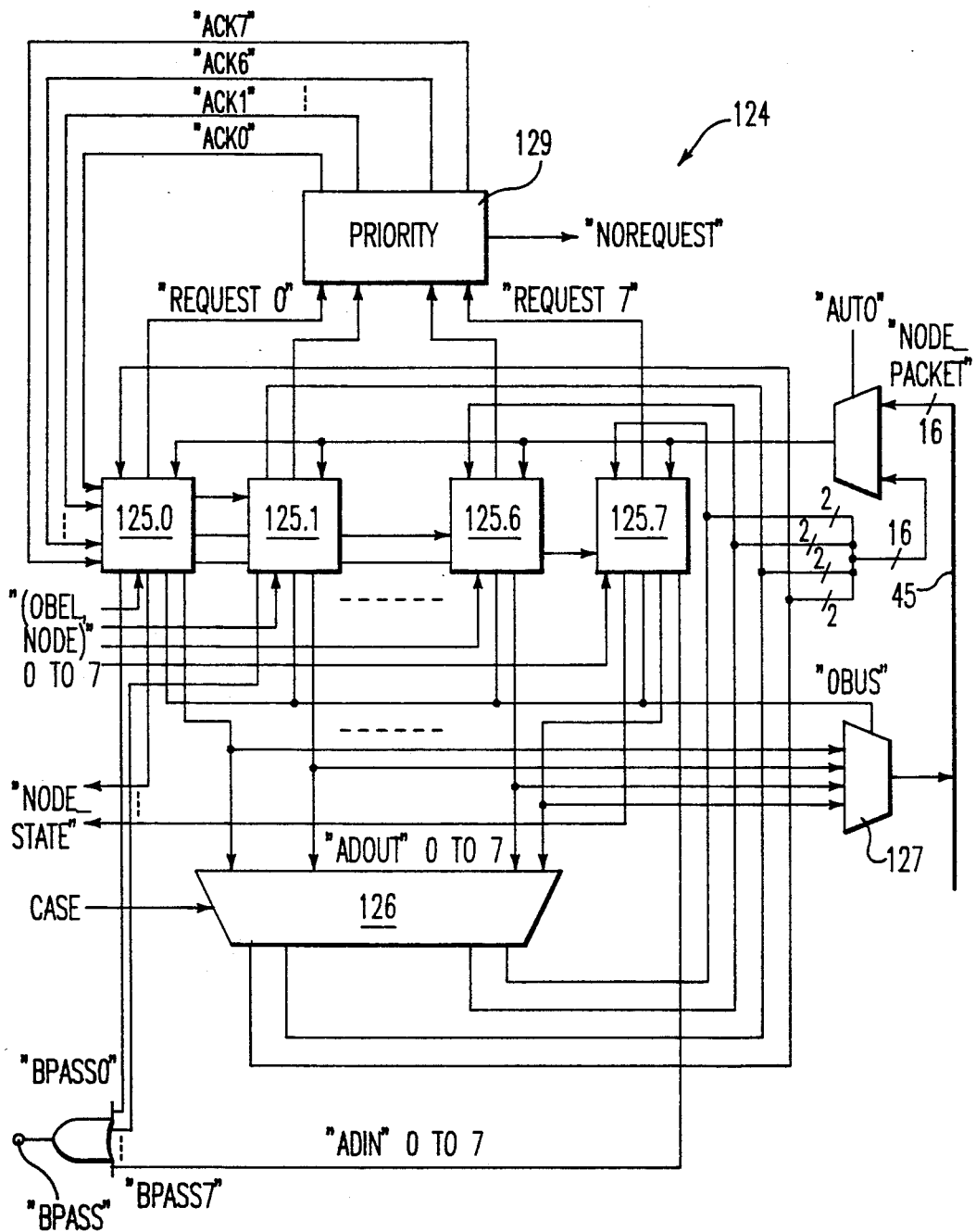

FIG. 21 shows one of the parts of the circuit 71, the circuit 124 for assembling an overlay. The circuit 124 has eight circuits with identical gates (described in detail below with reference to FIG. 22) marked 125.0 to 125.7. The outputs ("adout" signals) of these eight gates are connected firstly, to a multiplexer 126 and secondly, to a multiplexer 127. The eight outputs of the multiplexer 126 ("adin" signals) are connected to the inputs of the circuits with the gates 125.0 to 125.7. Furthermore, the bits representing the parent tree data of the eight "adin" signals are concatenated at the input of the multiplexer 128. The output of the multiplexer 127 is connected to the data bus 45 and it is controlled by the value of the "obus" signal of the gates 125.0 to 125.7 (see FIG. 22). Another series of inputs of the multiplexer 128 is connected to the data lines of the bus 45. The multiplexer 128 is controlled by te "auto" signal.

The "reguest" outputs of the gates 125.0 to 125.7 are connected to a priority distribution circuit 129, the "ack" outputs 0 to 7 of which are connected to corresponding inputs of these same gates. These gates furthermore, receive the obel and node addresses varying from 0 to 7 and emitting node status signals. The outputs bpass 0 to bpass 7 of these gates are connected to the inputs of an OR circuit 130 at the output of which the bpass signal of FIG. 15 is collected.

The multiplexer 126 is controlled by the case signal (case number varying between 1 and 27).

The function of the circuit of FIG. 21 is to go down in the tree of overlays. This function is closely related to the addressing mode for the object octree in the cache memory. For, in the memories of the overlay, there are assembled only the addresses at which the cache memory must be asked for the values or the properties of the nodes. At the moment of assembling a new overlay, a computation is done, according to the octree addressing rules, of the addresses of the cache memory at which the data on the overlay, should they be requested, will be found. Each of the eight computing circuits 125.0 to 125.7 which are all identical, has the role of computing the address of an obel of the new overlay according to on the former address.

Figure 22:
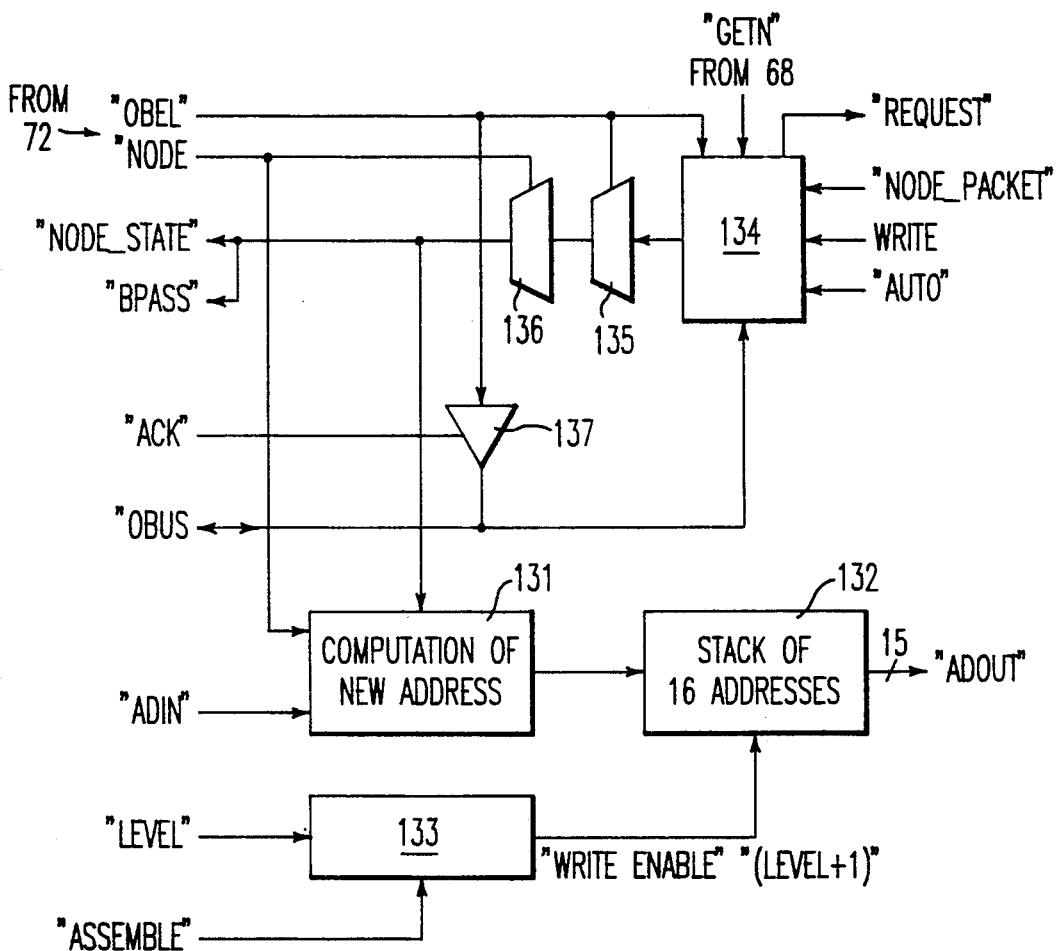

FIG. 22 gives the functional diagram of one of the eight computing circuits, which are simply marked 125 herein. The circuit 125 comprises a network 131 for the computation of the new address, described in detail with reference to FIG. 23 and receiving the "adin" data. The output of the network 131 is connected with a stack 132 which, in the present example, may contain 16 addresses computed by the network 131. At the output of the stack 132, the "adout" signals are collected. The write enable input of the stack 132 is connected to the output of a "4 towards 16" decoding circuit 133 which receives the "level" and "assemble" data and activates the reading of the stack 132 at the level "level+1".

Figure 24:
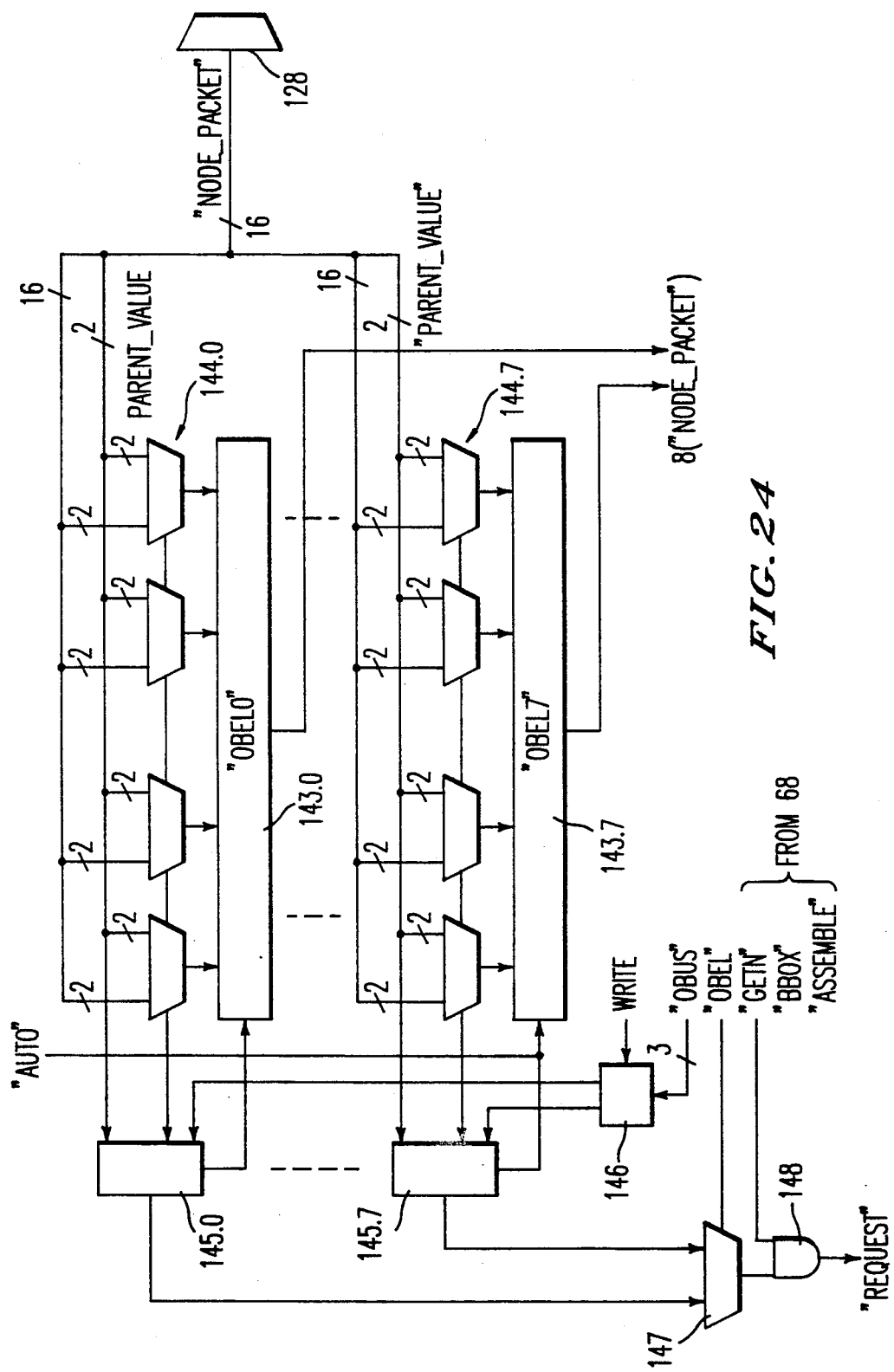

The circuit 125 further comprises a circuit 134 explained in detail above, with reference to FIG. 24. The circuit 134 receives the "get n" "node" "packet", "write", "auto", "obel number" and "obus" signals and produces the request signal on an output. Another output of the circuit 134 is connected to a first multiplexer 135 followed by a second multiplexer 136. The output of the second multiplexer 136 is connected to an input of th circuit 131 and further produces the node status and bpass signals from 0 to 7.

The obel addresses are also sent to a set 137 of 3-status gates controlled by "ack", the outputs of which are connected to the "obus" line.

At a given level, each circuit 125 delivers the "adout" address of the eight obels of the former overlay. Depending on the "case" variable, these eight addresses are presented at the multiplexer 126 at the input of each of these circuits 125 so that the circuit 125*i* (with i varying between 0 and 7) which has to compute the address of the obel number i, receives, at its input, the address of the obel in the former overlay to which it belongs ("adin").

Figure 23:
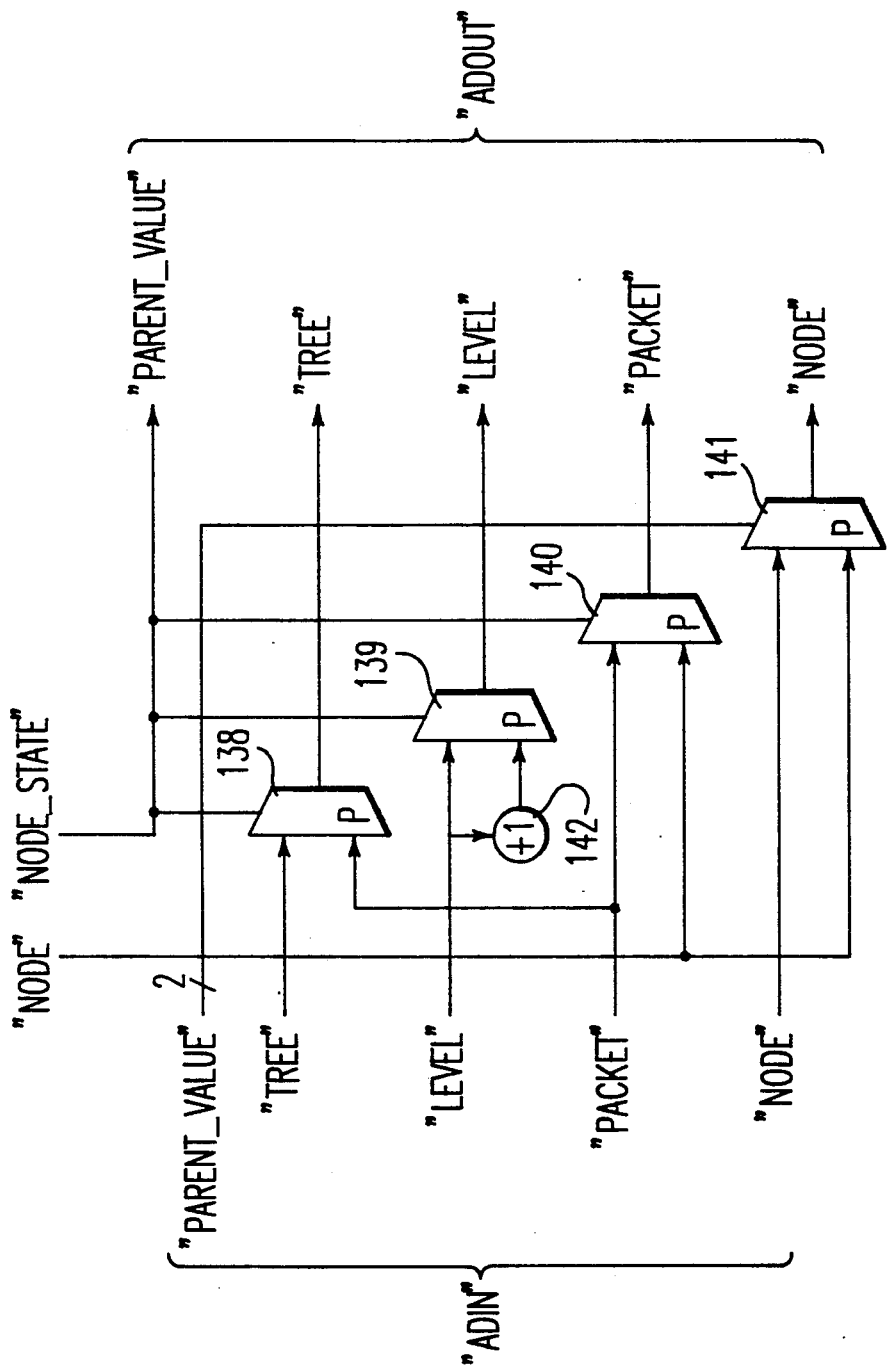

The eight addresses of the eight new obels are computed in parallel by the eight computing circuits such as the circuit 131, one of which has been shown in FIG. 23.

The circuit 131 comprises four two-input multiplexers marked 138 to 141. The first three multiplexers are controlled by node status which becomes the parent value for the "adout" signal, and the fourth multiplexer (141) is controlled by "parent value" of the "adin" signal.

The multiplexer 138 receives the "tree" and "packet" values of "adin" at its inputs and produces "tree" of "adout" at its output.

The multiplexer 139 receives "level" and "level+1" of "adin" at its inputs ("level+1" is obtained by a transcoder 142) and produces the "level" of "adout" at its output.

The multiplexer 140 receives, at its inputs, "packet" of "adin" and "node" from the cache memory and produces the "packet" of "adout" at its output.

The multiplexer 141 receives the "node" of "adin" and the "node" of the cache memory at its input and produces the "node" of "adout" at its output.

The circuit 131 computes the addresses of the eight new obels in the following manner: the circuit 134 computes the "node status" value of the node in the former overlay. In all cases, this "node status" becomes the new "parent value" of "adout" (direct link without going through multiplexers, between node status and parent value of "adout"). If node status is partial (value P), the multiplexers 138 to 140 are controlled so that their second inputs (marked P) are activated, thus giving the following (the new values are those of adout and the former values are those of adin):

New "tree"=former "packet".
New "level"=former "level+1".
New "packet"="requested node."
If "node status" is not partial, we get:
New "tree"=former "tree".
New "level"=former "level".
New "packet"=former "packet".
If former parent value is partial, the multiplexer 141 is controlled so that we get:
New "node"=requested "node".
and, if not, the multiplexer 141 is controlled in such a way that we get:
New "node"=former "node".

Upon the arrival of a "assemble" control signal transmitted by the sequencer 68, each circuit 125 records the new address thus computed in the stack of addresses 132 at the level "level+1". After each assembly, an automatic stage validates, in the overlay, those obels whose parent is not partial. The eight parent values are concatenated to be presented at the input of the eight circuits 125.0 to 125.7 by means of a multiplexer 128 controlled by the variable "auto".

The circuit 134, described in detail in FIG. 24, comprises eight registers, marked 143.0 to 143.7 each memorizing the eight nodes of an obel. As a result of this, the set of eight registers memorizes an overlay of eight obels. Each "cell" (memorizing one node) of each of the registers 143.0 to 143.7 is connected to the output of a multiplexer. The sets of eight such multiplexers corresponding to a register, are respectively marked 144.0 to 144.7. For each of the registers 143.0 to 143.7, each of the eight corresponding multiplexers has its first input connected to two of the sixteen respective lines of the output of the multiplexer 128 ("node-packet" signal), and each of these multiplexers has its second input connected to the two same lines (for one and the same register) of the output of the multiplexer 128 at which the parent value appears. The multiplexers are all controlled by the "auto" signal (produced by the sequencer 68) which validates their second inputs when it is true. The eight outputs of the registers 143.0 to 143.7 are connected to the multiplexer 135 (see FIG. 22).

With each of the registers 143.0 to 143.7, there is an associated validation combinational circuit, respectively marked 145.0 to 145.7. The inputs of each of these combinational circuits is connected to the parent value line coming from the multiplexer 28, to the "auto" command and to a corresponding output of a "3 towards 8" decoding circuit 146 validated by a write signal produced by the sequencer 68. The input of the circuit 146 is connected to the 3-status bus "obus". The outputs (activated in the event of invalidation) of the circuits 145.0 to 145.7 are connected to a multiplexer 147 controlled by the "obel" value. The output of the multiplexer 147 is connected to a first input of an AND gate 148, the second input of which is connected to the sequencer 68 which, depending on the status in which it is, sends it one of the following signals, "get n" "Bbox" or "assemble". At the output of the gate 148, the "request" signal, which is sent to the priority distribution circuit 129 (see FIG. 21), is collected.

Each circuit 125 can receive (from the "geometry" circuit 72 which is a part of the geometrical processor 30) an address ("obel", "node") in the current overlay. When one of the circuits 134 needs to call the cache memory to find out a value, it generates a "request" signal at the AND output 148. Two different processes may then take place, depending on the rank of the circuit 125 that receives the "getn" signal:

if the circuit 125.0 receives the "getn" command, it sends back the "node status" value to the circuit 69 (paint test) as soon as the no request signal produced by the priority distribution circuit 129 is valid, namely as soon as no priority request reaches the said circuit 129.

if the circuit 125.7 receives the "getn" command, it sends back the node status value to the image generating circuit 70 as soon as the no request signal is valid.

If each of the circuits 125.0 to 125.7 receives a "Bbox" signal (on the second input of AND 148), as soon as either of them recognizes a "node status", different from "E" (i.e. equal to P or F), its circuit 134 sends a true bpass variable via the OR 130 to the sequencer 68. This means that the "Bbox" test is correct. However, if all the "bpass" variables of the eight circuits 125 are false when the "no request" signal is valid, it means that the "Bbox" test is not correct.

As soon as one of the circuits 125 sends a "request" signal to the circuit 129, i.e. as soon as, in one of the circuits 134, one of the circuits 145 validates its output, the circuit 129 (see FIG. 21) selects the circuit 125 to be served by validating the corresponding "ack" signal (the circuit 129 can be made in any manner known per se to distribute priority when there are several simultaneous requests, so as to immediately grant priority to a single requesting unit and so as to make the no request variable true for as long as no request is transmitted). The circuit 125 involved then positions its obel variable, through its three-status gate 137, on the three-status bus "obus" which selects the address to be sent to the octree bus through the multiplexer 127. When the cache memory sends the corresponding data in response to this address, the node packet variable is validated in one of the registers 143.0 to 143.7 corresponding to the data present on "obus", and does this in all the circuits 125.0 to 125.7. Finally, the circuit 125 involved eliminates its request signal.

Figure 25:
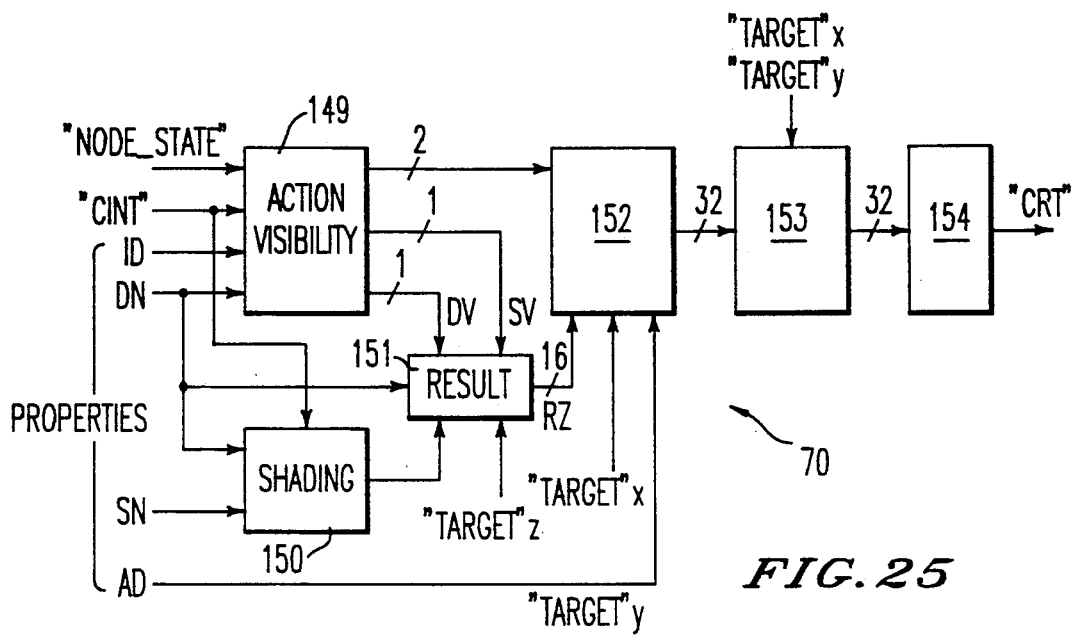
Figure 28:
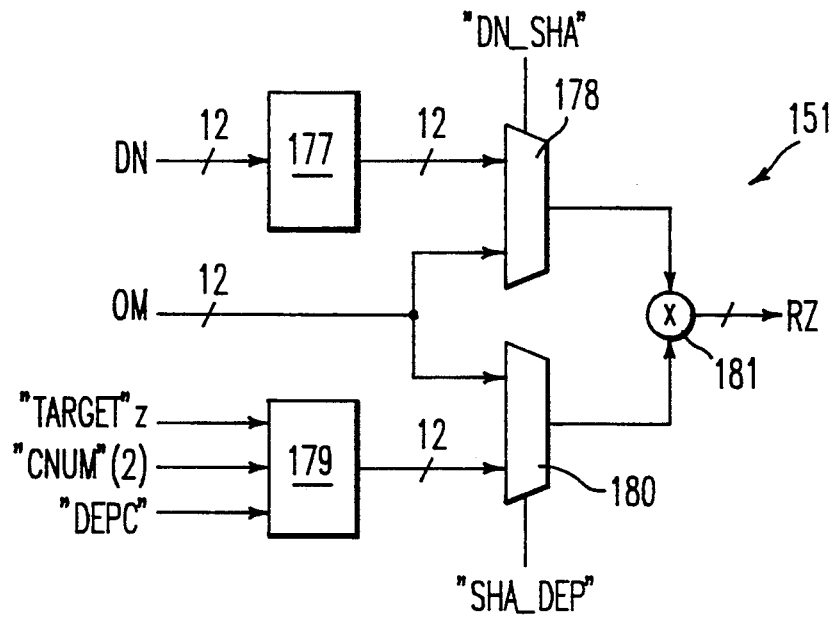
Figure 29:
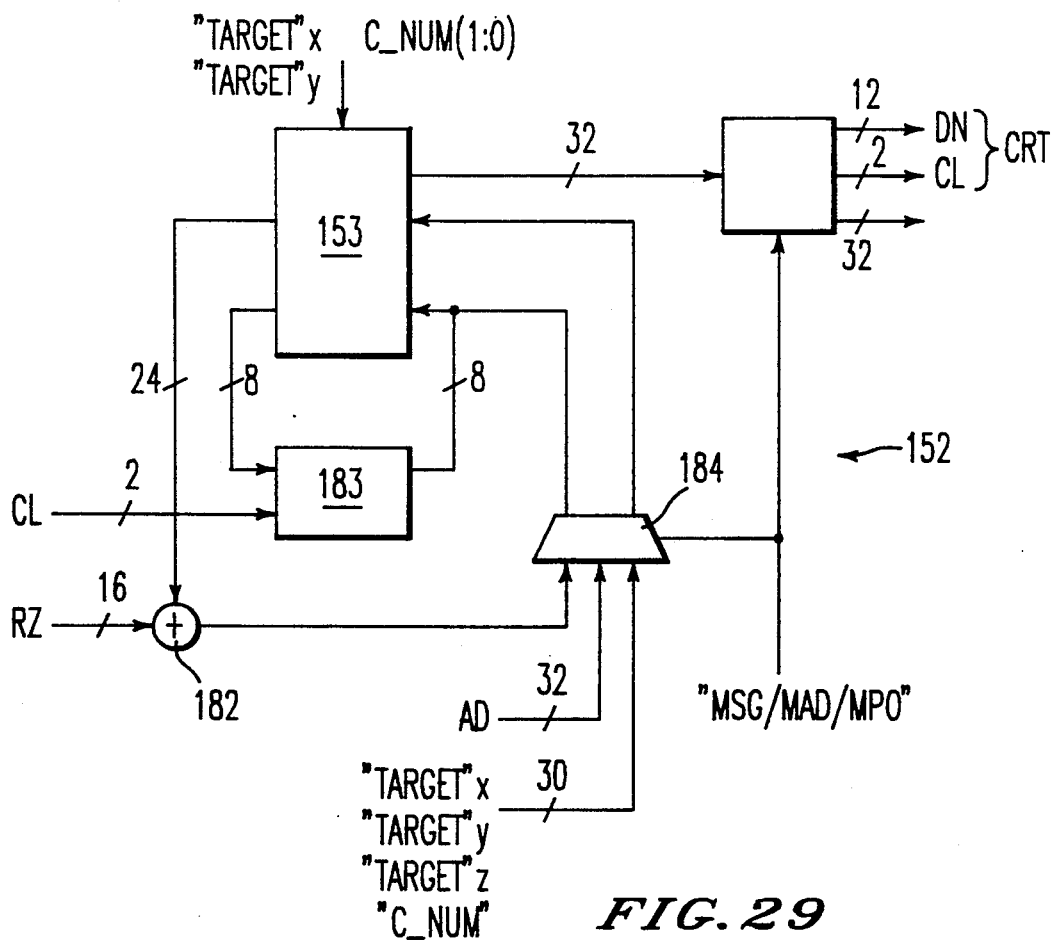

FIG. 25 shows the functional diagram of the image generating circuit 70. The circuit 70 has a circuit 149 known as an "action visibility" circuit (see FIG. 26), a shade-computing circuit 150 (see FIGS. 27A and 27B), a result-computing circuit 151 (see FIG. 28), a write circuit 152 (see FIG. 29) of the image buffer 153 and a selecting circuit 154 connected through an image memory and an appropriate interface to the image tube (not shown).

When the "paint test" circuit 69 has ascertained that the imels have to be painted, it sends the sequencer 68 a "paint" signal. The sequencer 68 causes the corresponding value of the node status to be sent to the circuit 149 via the circuit 71. To decide the painting value to be sent to the circuit 153, the circuits 149 to 152 perform the following functions: reading of the property of the node to be painted in the octree memory (if the property is a density, the circuits decide whether it should be chosen), determining the nature of the information to be painted (shading or density) according to the value of the node, the properties of the object, the position of the object in the various cut planes and the density threshold setting, then the circuits compute the shading, if necessary, and totalize the results in the buffer memory 153 at the address of the pixel to be painted.

Figure 26:
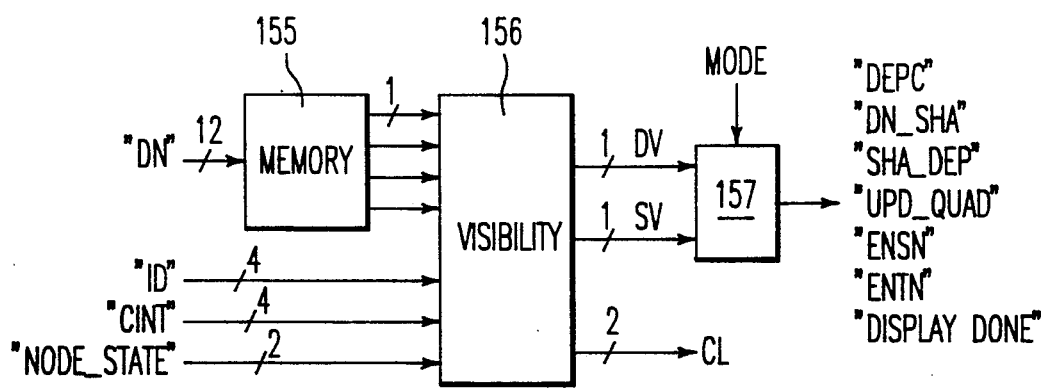

The circuit 149 comprises, as shown in FIG. 26, a density transcoding memory 155 that receives the "density" property ("dn" on 12 bits in the present example). The memory 155 is followed by a visibility-determining memory 156. This memory 156 is itself followed by a command-generating logic circuit 157.

The memory 155 is used to select the densities to be retained depending on the four possible values (E, B, F and F1 in the present example) of the nodes.

The action-deciding memory 157 decides to paint each pixel in the following manner: if "dv" and "sv" are null, the pixel-painting action is aborted and the circuit 70 sends back the sequencer 68 the acknowledgement of its action without having actually painted. If "dv" is true, the density will be painted. If "sv" is true, the shading will be painted. If both "dv" and "sv" are true, the combination of the density and the shading will be painted. These decisions make it possible to select the object to be painted through the identification bits "id" (forming a part of the properties, of which there are four in the present example), to paint in density on a cut plane and in shading elsewhere, or to paint only the nodes of a certain value, etc.

The circuit 156 also produces "cl" data by which it is possible to choose a color to be painted (data on two bits in the present example).

Figure 27A:
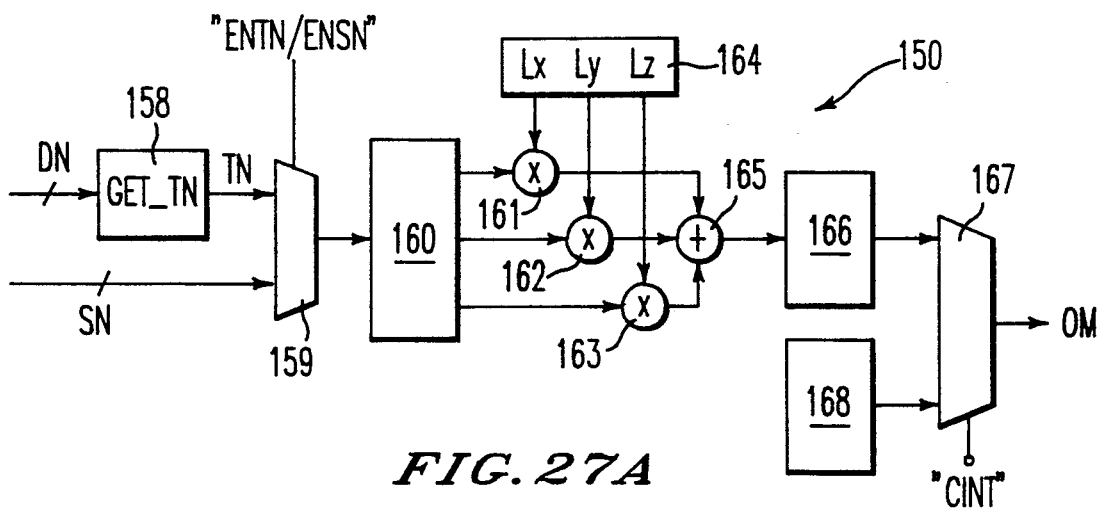

FIG. 27a shows the diagram of the shade computing circuit 150. The circuit 150 has a circuit 158, called "get tn" to compute the perpendicular to a surface. This circuit 158 is described below in greater detail with reference to FIG. 27b. The circuit 158 receives a density datum "dn" (forming part of the properties) and produces an output datum "tn" on the perpendicular to a surface. This datum is sent to a multiplexer 150 which receives, at its other input, a datum sn (also forming part of the properties).

The output of the multiplexer 159 is connected to a transcoding memory 160 used to standardize the values that it receives. Its three outputs, corresponding to the coordinate axes, are connected to multipliers 161 to 163 which also receive from three memories 164. These three memories 164 give them the value of the direction of the light illuminating the observed object (Lx, Ly, Lz) expressed in the coordinates system of the object. The outputs of the three multipliers 161 to 163 are connected to an adder 165 followed by a transcoding memory 166. The multipliers 161 to 163 do the scalar product of the value of the perpendicular and the direction of the light, and the memory 166 does a correction which makes it possible to adapt the result given by the adder 165, for example, to obtain the absolute value of the scalar product, so as to improve the quality of the light given in a manner known per se.

The output of the memory 166 is connected to a first input of a multiplexer 167, the other input of which is connected to the output of a memory 168 giving a pre-computed shade value which is selected by the multiplexer 167 if the pixel to be painted is on one cut plane (non-zero "cint" variable).

Figure 27B:
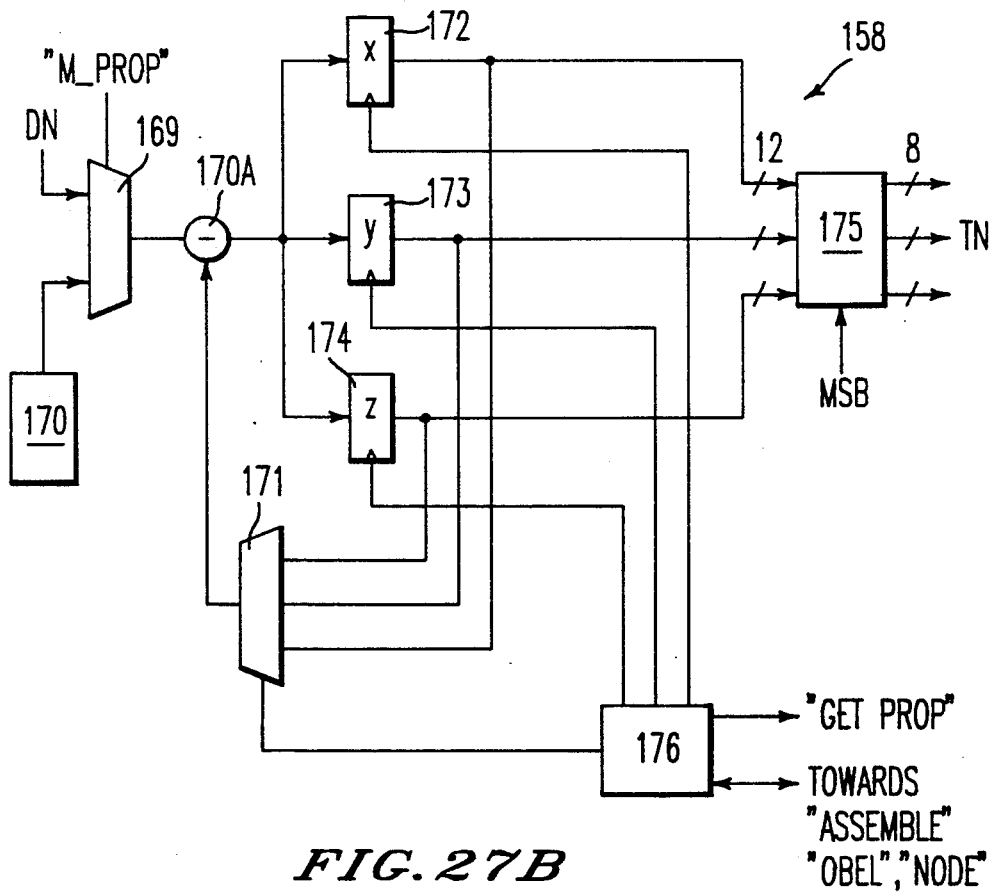

The circuit 158, shown in detail in FIG. 27b comprises a multiplexer 169, one input of which receives the density signal "dn" and the other input of which is connected to a memory 170 which gives, by default, a pre-calculated density value for each value E, P, F, F1 of the nodes that do not have the density property in the octree. The multiplexer 179 is controlled by the "m-prop" variable given by the controller 176.

The output of the multiplexer 169 is connected to an input of a subtractor 170A, the other input of which is connected to the output of a multiplexer 171. The output of the subtractor 170A is connected to the inputs of three registers 172 to 174, respectively assigned to the three components x, y, and z of the nodes of the overlays. The outputs of the registers 172 to 174 are connected to a shift register 175. In the present example, the outputs of the registers 172 to 174 have 12 bits and the circuit 175 standardizes them comprehensively on eight bits. The validation signal inputs of the registers 172 to 174 are connected to a control circuit 176 which also controls the multiplexer 171. The control circuit 176 produces the "get prop" signal and exchanges the values ("obel" "node") with the circuit 71.

The circuit 158 calculates a perpendicular in the current overlay reference by sampling six points around the current node (xo, yo, zo) and by taking three differences. If a node of the overlay is identified by three components x, y, z varying between 0 and 3, the three differences for these components are calculated as follows: for the axis Ox by calling diff (x) the component of the difference of densities along the axis Ox.

for xo=1 or 2: diff(x)=(density (xo+1(-density) xo-1)/2 for xo=0: diff(x)=density(1) - density(0).

for xo=3: diff(x)=density(3) - density(2).

The same procedure is followed for diff(y) and diff(z). Each point (x,y,z) to be sampled in the overlay is directly encoded in ("obel","node").

The result-computing circuit 151 has an attenuation transcoding memory 177 which corrects the value of the density "dn" to be projected (this is necessary, for example, in the case of a radiographic synthesis). The output of this memory 177 is connected to an input of a multiplexer 178, the other input of which receives the value of "om" (shading) and is controlled by "dn sha" coming from the circuit 157. The circuit 151 further comprises another transcoding memory 179 that receives the "target z" value, the most significant bit of the variable "c-num". This transcoding memory 179 is controlled by the variable "depc" (produced by 157) and is connected to an input of a multiplexer 180 that receives, at its other input, the value "om" and is controlled by the signal "sha dep" coming from the circuit 157. The outputs of the multiplexers 178, 180 are connected to a multiplier 181, the output signal of which is called "rz' and is sent to the circuit 152. The memory 179 is used to calculate a depth coefficient either for the density (coming from 177) or for the shading.

Depending on the values of "db" and "sb" sent to the circuit 157 and producing the commands "sha dep" and "dn sha", the value "rz" at the output of the multiplier 181 is:

either the product of the density corrected by the depth coefficient.

or the product of the shading by the depth coefficent.

or the product of the density by the shading.

The image buffer 153 is associated with a read circuit 152 comprising an adder 182 connected to the output of the circuit 151 (signal "rz") and to an output (on 24 bits) of the buffer 53. The output of the adder 182 is connected to an input of a multiplexer 184, the other two inputs of which respectively receive the property "ad" and the addresses "target x", "target y", "target z", as well as "c num". The multiplexer 184 is controlled by one of the control parameters "msg" "mad" or "mpo". When "msg" is true (summation mode), the 24 least significant bits of each pixel memorized in the buffer 153 contain the result of the sum of the signals "rz" and the eight most significant bits contain the result of the concatenation of the signals "cl".

When "mad" is true (address mode), the 32 bits of each pixel contain the address in the octree memory of the projected obel expressed by ("node number in the packet" "packet number in the block" "address of the block").

When "mpo" is true (position mode), the 32 bits of each pixel contain the coordinates ("target z", "target y", "target x") of the obel projected (three fields of 10 bits).

The buffer 153 is addressed by "target x", "target y" and the two least significant bits of "c-num" (references "c-num(o)" and "c-num(1)").

In the current functioning mode, "msg" is true and the geometrical processor adds up the result calculated in the buffer 153 at the "target x", "target y" address. Under current conditions, the processor therefore cumulates four results at the same address, thus creating an "antialiasing" effect on the image. It is possible to eliminate this antialiasing effect by writig the result at the address ("target x":) "c-num (o)"), ("target y":"c-num (1)") corresponding to the address of the pixel painted at the following level ("level+1").

Should the masking of the obels projected by the quadtree be inactivated, we get, in the buffer 153, the cumulated image of all the projections of the object in the relevant direction.

The 12 most significant bits (on the entire image) are sent to the image display system (connected to the output of 154) at the end of the image generation.

The selected colors are composed, on eight bits for example, in the buffer 153. Two resulting bits are sent to the image display system at the end of the image generation.

In the case of the "mad" and "mpo" operating modes, the 32 bits of the buffer 153 are sent to a processing system to generate 3D identifying or measuring functions for example.

The circuits described above can be used for a great many applications through combinations of different ways of creating an image and positioning the object, achieved by the various operating modes of the geometrical processor and, especially, by the memory 156 (FIG. 26).

The three main operating modes of the geometrical processor are: the address mode, the position mode and the summation. Furthermore, in the summation mode, we can distinguish between the non-transparent mode and the transparent mode.

address mode (true "mad" variable). In this mode, the image generated is a matrix of absolute addresses in octree memory of the obels of the octree of the object seen. These addresses are described in the form: ("absolute address of packet of parent nodes in block to which the seen node belongs", "number of packets in this block", "number of nodes in this packet"). By pointing to a pixel of the screen, it is possible to identify an obel in the octree memory, for example, in order to modify its characteristics.

position mode (true "mpo" variable). In this mode, the image generated is a matix of positions (x,y,z) in the object identification of the obels seen. By pointing at the screen, it is possible to make measurements in the space of an object.

summation mode (true "msg" variable). This is the standard functioning mode of the processor. It is possible to distinguish between two sub-modes in this mode:

* non-transparent mode: each painted pixel marks the quadtree memory, the effect of which is to hide the unseen parts of the object (the obels are explored from the front backwards).

* transparent mode: the painted pixels do not modify the quadtree memory. It is therefore the initial status of the quadtree memory that supervises the possibility of painting or not painting the pixels. In particular, if the quadtree is entirely null, the total of the images seen in the direction of the projection (on the screen) is obtained.

In addition to these modes, when the shading displays are programmed, the processor must be informed whether the shading should be calculated when the opportunity arises for it, on the basis of density, or whether the pre-calculated shading should be used.

Figure 30:
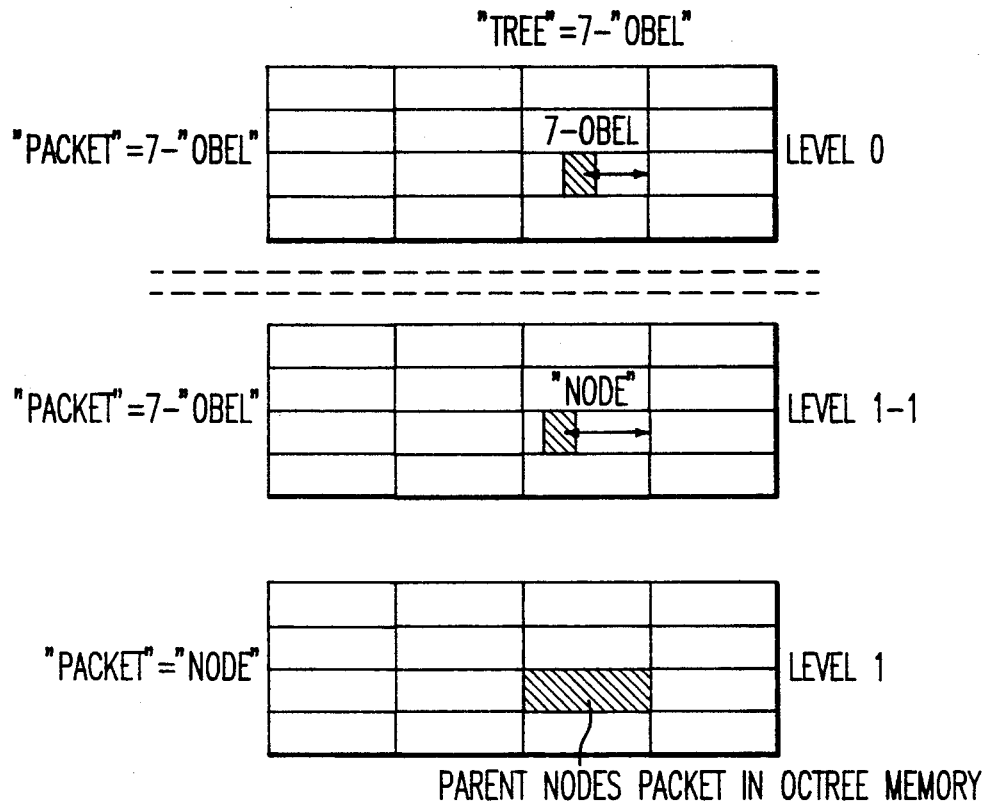
Figure 30:
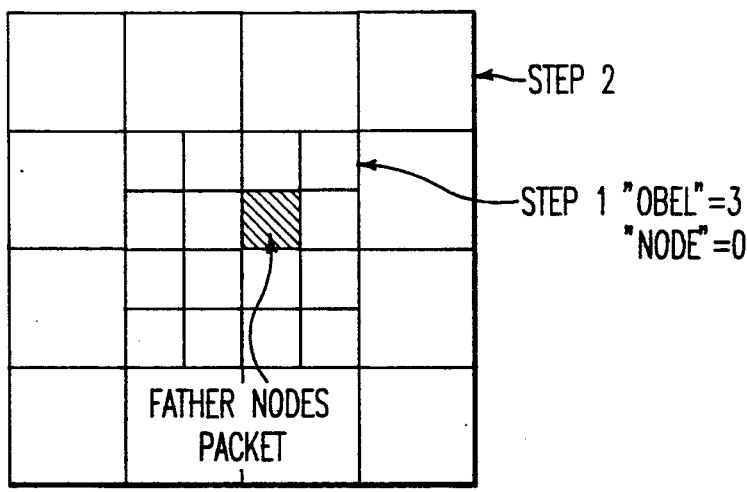

We shall now describe the initialization of the processor and, with reference to FIG. 30, the initialization of the cache memory.

The initialization of the processor should determine: the first levels of the cache memory up to the parent node of the octree in the octree memory, the status registers of the geometrical processor at the level 0 ("target center" and the address in the cache memory of the overlay at the level zero), and the geometrical functioning parameters: "child offset", "Bbox offset", and "cut offset" (offset of D' in FIG. 10).

The functioning mode of the geometrical processor makes it necessary to resolve two problems in order to perform the initialization. These problems are expressing the coordinates of a point of the target in the object identification and defining the initial overlay in such a way that the target respects the rules of inclusion in the overlay.

Let us consider the object as defined in the octree memory and positioned with respect to the target. Let x,y,z, be the coordinates of a point of the target in the target reference. Let X,Y,Z be the coordinates of the same point in the object reference. As long as the inclusion rule is not respected, the values X,Y,Z can emerge from the interval (0.7FFFh). Let Ox, Oy and Oz be the coordinates of the point of origin of the object reference in the target. Let R be the rotation and h the homothetic transformation undergone by the object from the initial position it has when it is identified with the target. We then get:

$$\begin{bmatrix} x \\ y \\ z \end{bmatrix} = h.R. \begin{bmatrix} x \\ y \\ z \end{bmatrix} + \begin{bmatrix} ox \\ oy \\ oz \end{bmatrix}$$

giving:

$$\begin{bmatrix} x \\ y \\ z \end{bmatrix} = 1/h.R \left\{ \begin{bmatrix} x \\ y \\ z \end{bmatrix} - \begin{bmatrix} ox \\ oy \\ oz \end{bmatrix} \right\}$$

The purpose of the following steps is to ensure that the inclusion rules are followed.

First step: addition of two levels. In this first step, an overlay is defined such that the initial, indivisible overlay, represented by the parent nodes packet of the memorized octree, becomes one of the 64 obels of the new overlay, with all the other obels being empty.

The level 0 is formed of seven empty obels and an "obel" number obel, the child of which, with a "node" number, is the parent nodes packet of the octree in the octree memory.

The address ("obel", "node") is determined in such a way that the target center is as close as possible to the center of the new overlay.

The following transformations are, therefore, performed on each of the X, Y and Z coordinates of all the points defined in the overlay:

If "target center" is smaller than or equal to $-4000_h$,
"obel"=1
"node"=1
X=X/4+6000h If "target center" is greater than or equal to $-3FFF_h$ and smaller than or equal to $3FFF_h$, we get:
"obel"=1
"node"=1
X=X/4+4000$_h$ If "target center" is greater than or equal to 4000h and smaller than or equal to BFFF$_h$, we get:
"obel"=0
"node"=1
X=X/4+2000$_h$ And if "target center" is greater than or equal to COOO$_h$ we get:
"obel"=0
"node"=0
X=X/4

Second step: addition of a level for as long as the target is not included in the overlay. If the inclusion rules are not verified at this level, either because a part of the target is outside the overlay or because the target is too big, a level is added to the target in a concentric way. As long as the inclusion rule is not verified, the following transformation is performed:

$$X = X/2 + 2000^h$$

Among various possible solutions to initialize the cache memory, we shall describe one below with reference to FIG. 30. This solution makes it possible to find a repetitive initialization structure regardless of the number of levels added. It is assumed, in the example of FIG. 30, that the packet of parent nodes has been positioned in the first step in the "obel" number obel and in the "node" number node.

The first step initializes two levels, and each following step then initializes an additional level.

The level 1 of the parent nodes packet of the octree memory will be therefore equal to 1 if only the first step is done, and will be increased by 1 for each second step done subsequently.

It suffices to validate the data registers up to level 1, and to change the absolute address of the child of the parent nodes packet in the cache memory of the addresses. After this step, it is necessary to initialize the overlay of the geometrical processor in such a way that the "obel" obel number has a partial parent and knows the cache memory address ("tree"="7-obel", "packet"="7-obel" in the example of FIG. 30) of the block that describes it.

What is claimed is:

1. A method for 3D display onto a screen of a digitally encoded object in octree form, comprising the steps of:

building, for each point of said object, at each level of its octree, an overlay by selecting for each such point an "obel" and seven adjoining obels for forming a cube called "overlay", digitizing the coordinates of each point of said object, establishing a correspondence between the digitized coordinates of each point of said object and the address in the overlay, by selecting the two most significant bits of each of said coordinates which provide an obel number and a node number in said obel containing each said point, selecting a child overlay among all possible child overlays of a parent overlay by choosing the one child overlay whose center is the nearest to a corresponding child obel center, and so on for all other octree levels, building a target universe such as the plane formed by its aces Ox, Oy, said target universe being parallel to said display screen, and said target universe being a zero level obel of a target octree to be generated and corresponding to a chosen single angle, dividing said zero level obel by two along each coordinate axis to obtain 8 son obels, dividing in the same way each son obel, and so on down to a desired resolution, thus achieving the building of a target octree, projecting obels of said target universe onto the display screen for forming "imels" of a 3D image, giving priority so that only information relating to the visible part of said object is to be displayed whereby the obels which are closest to said display screen and, when those examined obels are empty, the obels behind them in distance away from said display screen are examined so that priority is given to the obels closest to the display screen if they are not empty.

2. A method according to claim 1 wherein, from a target screen, a target octree is defined which is projected canonically in an image quadtree on a display screen, a correspondence between numbers of said obels of the target octree and imel numbers of the image quadtree, wherein said imel refers to image elements on the screen corresponding to the obels, being constant and independent of an angle of view and of a level of the target octree.

* * * * *